United States Patent [19]

Chorley et al.

[11] Patent Number: 4,649,533
[45] Date of Patent: Mar. 10, 1987

[54] METHOD AND APPARATUS FOR RETRIEVING REMOTELY LOCATED INFORMATION

[75] Inventors: William Chorley, Plymouth, Minn.; Robert Redding, Chicago; Christopher Fries, Crystal Lake, both of Ill.

[73] Assignee: Keycom Electronic Publishing, Chicago, Ill.

[21] Appl. No.: 545,068

[22] Filed: Oct. 25, 1983

[51] Int. Cl.[4] .......................................... H04Q 11/04
[52] U.S. Cl. ........................................ 370/58; 370/54; 379/94
[58] Field of Search ...................... 370/56, 58, 54, 53; 179/2 DP

[56] References Cited

U.S. PATENT DOCUMENTS

| | | | |
|---|---|---|---|
| 3,885,108 | 5/1975 | Zock ................................ | 179/2 DP |
| 3,932,709 | 1/1976 | Hoff et al. ......................... | 179/2 DP |
| 4,201,887 | 5/1980 | Burns ................................ | 179/2 DP |
| 4,289,930 | 9/1981 | Connolly et al. ................. | 179/2 DP |
| 4,291,198 | 9/1981 | Anderson et al. ................ | 179/2 DP |
| 4,466,095 | 8/1984 | Kawano et al. .................... | 370/58 |

Primary Examiner—Douglas W. Olms
Assistant Examiner—Wellington Chin
Attorney, Agent, or Firm—Bernard L. Kleinke

[57] ABSTRACT

The information retrieval method and apparatus includes a group of geographically widely-distributed terminals, which accept a remotely located host computer. Each terminal includes a memory for storing a plurality of items of call origination information. A call original circuit transmits individual ones of the items of call origination information via a communication path to the switching system for causing it to extend the path to the host computer. Logic circuits transfer a first one of the items of call origination information indicative of the geographically shortest communication path, to the call origination circuit in an attempt to extend a communication path, of the geographically shortest length, to the host computer. If the attempt proves unsuccessful, the logic circuit sends automatically a second one of the items of call origination information, indicative of the next shortest communication path length.

16 Claims, 12 Drawing Figures

POWER-ON PAGE

TO CONTACT
SYSTEM COMPUTER

FIRST PRESS (CALL) KEY

THEN EITHER PRESS ....

OR

TYPE THE NUMBER THEN
PRESS ....

CALL SETUP PAGE

TO CONTACT
SYSTEM COMPUTER

FIRST PRESS (CALL) KEY

THEN EITHER PRESS ....

OR

TYPE THE NUMBER THEN
PRESS ....

A C T I O N

X-XXX-XXX-XXXX-XXXX-XXXX
ACTION DIALS THE NUMBER

CALL PROGRESSION PAGE

TO CONTACT
SYSTEM COMPUTER

FIRST PRESS (CALL) KEY

THEN EITHER PRESS ....

OR

TYPE THE NUMBER THEN
PRESS ....

A C T I O N

X-XXX-XXX-XXXX-XXXX-XXXX
DIALING
X-XXX-X

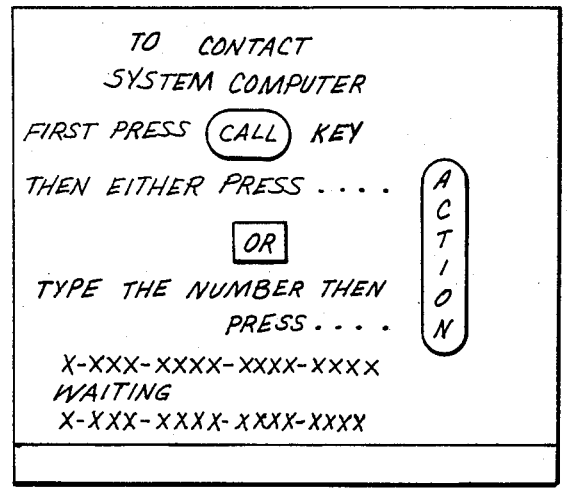
FIG 7
CALL CONNECTION / WAITING PAGE
TO CONTACT SYSTEM COMPUTER
FIRST PRESS (CALL) KEY
THEN EITHER PRESS ....
OR
TYPE THE NUMBER THEN PRESS ....
ACTION
X-XXX-XXXX-XXXX-XXXX
WAITING
X-XXX-XXXX-XXXX-XXXX
FIG 8
BYTE ADDRESSES
| Address | Content |
|---|---|
| 00-07 | TERMINAL ID |
| 08-0F | CLASS |
| 10- | |
| | HOST MANAGED AND INTERPRETED DATA |
| DA | |
| DB-E6 | 3RD ACCESS # (OPT) |
| E7-F2 | 2ND ACCESS # (OPT) |
| F3-FE | 1ST ACCESS # |
| FF | N |
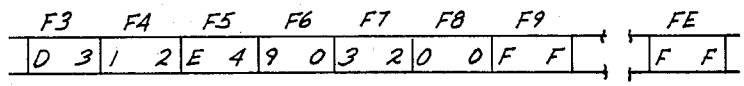
FIG 9
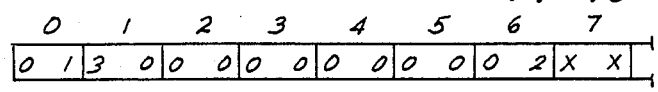
FIG 10

1

METHOD AND APPARATUS FOR RETRIEVING REMOTELY LOCATED INFORMATION

TECHNICAL FIELD

The present invention relates in general to information retrieval systems, such as a videotex system. It more particularly relates to a method and apparatus for communicating relatively inexpensively between a host computer and geographically widely-distributed large groups of terminals.

CROSS REFERENCES TO RELATED APPLICATIONS (1) TERMINAL FOR INFORMATION SYSTEM, by John F. Graham and Daniel L. Williams, Ser. No. 545,615, filed Oct. 25, 1983;

(2) INFORMATION SYSTEM TERMINAL OR THE LIKE, design patent application by John F. Graham and Daniel L. Williams, Ser. No. 545,614, filed Oct. 25, 1983;

(3) METHOD AND APPARATUS FOR FAST ACCESS OF REMOTELY LOCATED INFORMATION, by Peter M. Winter, Thomas R. Ray, and Mary E. Burkhardt, Ser. No. 545,070, filed Oct. 25, 1983;

(4) METHOD AND APPARATUS FOR RETRIEVING INFORMATION, by Anthony Kram, Ser. No. 805,830, filed Dec. 6, 1985;

(5) METHOD AND APPARATUS FOR RETRIEVING INFORMATION DISTRIBUTED OVER NONCONSECUTIVE PAGES, by Peter M. Winter and Neil L. Holman, Ser. No. 545,124, filed Oct. 25, 1983;

(6) METHOD AND APPARATUS FOR ASSISTING USER OF INFORMATION RETRIEVAL SYSTEM, by Anthony Kram, Peter M. Winter, and Neil L. Holman, Ser. No. 545,069, filed Oct. 25, 1983;

(7) METHOD AND APPARATUS FOR INFORMATION RETRIEVAL, by J. William Burk, Jr., Christopher Fries, and Peter M. Winter, Ser. No. 545,128, filed Oct. 25, 1983.

BACKGROUND ART

Videotex systems interactively connect a host computer to large groups of geographically widely-distributed terminals. In this manner, remotely located information can be retrieved by the terminals.

In order to establish communication paths between the terminals and the host computer, telephone connections have been employed. While such telephone communications have become popular in videotex systems, the subscribers to such a system, must not only pay the charges for the videotex system, but also the telephone charges. The telephone charges can become very substantial as compared to the videotex service charges.

The telephone charges are prohibitively large, especially where the terminal is located at a great distance from the host computer. Thus, it would be highly desirable to have a new and improved method and apparatus for an information retrieval system, such as a videotex system, to enable the terminals to communicate relatively inexpensively with a remotely located host computer over communication paths, such as telephone lines. Such a technique should reduce the service charges, as compared to conventional techniques.

Moreover, in such a system where information is retrieved from distant locations, it is desirable to enable complete computer programs to be exercised locally by the user interacting with a terminal in an economical and efficient manner. In this regard, if a program requires a great deal of real time to execute, the cost of maintaining the communication path during the execution thereof, may be substantial, and in some instances, prohibitively high. Thus, a more cost effective and efficient system for enabling the execution of longer programs, would be highly desirable.

DISCLOSURE OF THE INVENTION

Therefore, the principal object of the present invention is to provide a new and improved method and apparatus for retrieving remotely located information in a relatively inexpensive manner and in a highly efficient and effective manner.

Another object of the present invention is to provide such a new and improved method and apparatus, which enables a host computer to communicate with individual ones of a large group of geographically widely-distributed terminals, over telephone lines, in a cost effective manner.

Still another object of the present invention is to provide such a new and improved method and apparatus, which enables an entire program to be downloaded from a remotely located host computer to a terminal, in a highly efficient and effective manner.

Briefly, the above and further objects of the present invention are realized by providing a new and improved information retrieval system, which includes a method and apparatus for facilitating the information retrieval in a relatively inexpensive and efficient manner.

The information retrieval method and apparatus includes a group of geographically widely-distributed terminals, which access a remotely located host computer. Each terminal includes a memory for storing a plurality of items of call origination information. A call origination circuit transmits individual ones of the items of call origination information via a communication path to the switching system for causing it to extend the path to the host computer. Logic circuits transfer a first one of the items of call origination information indicative of the geographically shortest communication path, to the call origination circuit in an attempt to extend a communication path, of the geographically shortest length, to the host computer. If the attempt proves unsuccessful, the logic circuit automatically sends a second one of the items of call origination information, indicative of the next shortest communication path length.

Other features of the invention relate to the concentrating of groups of communication paths, at geographically distributed locations, to a smaller number of dedicated lines, for the purpose of saving added telephone charges.

Still other features relate to the provision of a method and apparatus for establishing an initial communication path to a terminal, when it is first cut into service, to enable the host computer to initialize the new terminal.

Further advantages of the present invention relate to the downloading of telesoftware programs from the host computer to a terminal for more effectively and efficiently executing the program. In this manner, if desired, the communication path can be disconnected, while the program is being executed in the terminal.

Alternatively, the host computer can interact with the terminal via the communication path Additionally, the communication path can be controlled in response to information contained in the telesoftware program.

BRIEF DESCRIPTION OF DRAWINGS

The above-mentioned and other objects and features of this invention and the manner of attaining them will become apparent, and the invention itself will be best understood by reference to the following description of an embodiment of the invention taken in conjunction with the accompanying drawings, wherein:

FIGS. 4-7 are illustrative views of pages of displayed information, useful in understanding the present invention;

FIGS. 8-10 are memory layout diagrams useful in understanding the present invention.

BEST MODE FOR CARRYING OUT THE INVENTION

Figure 1:
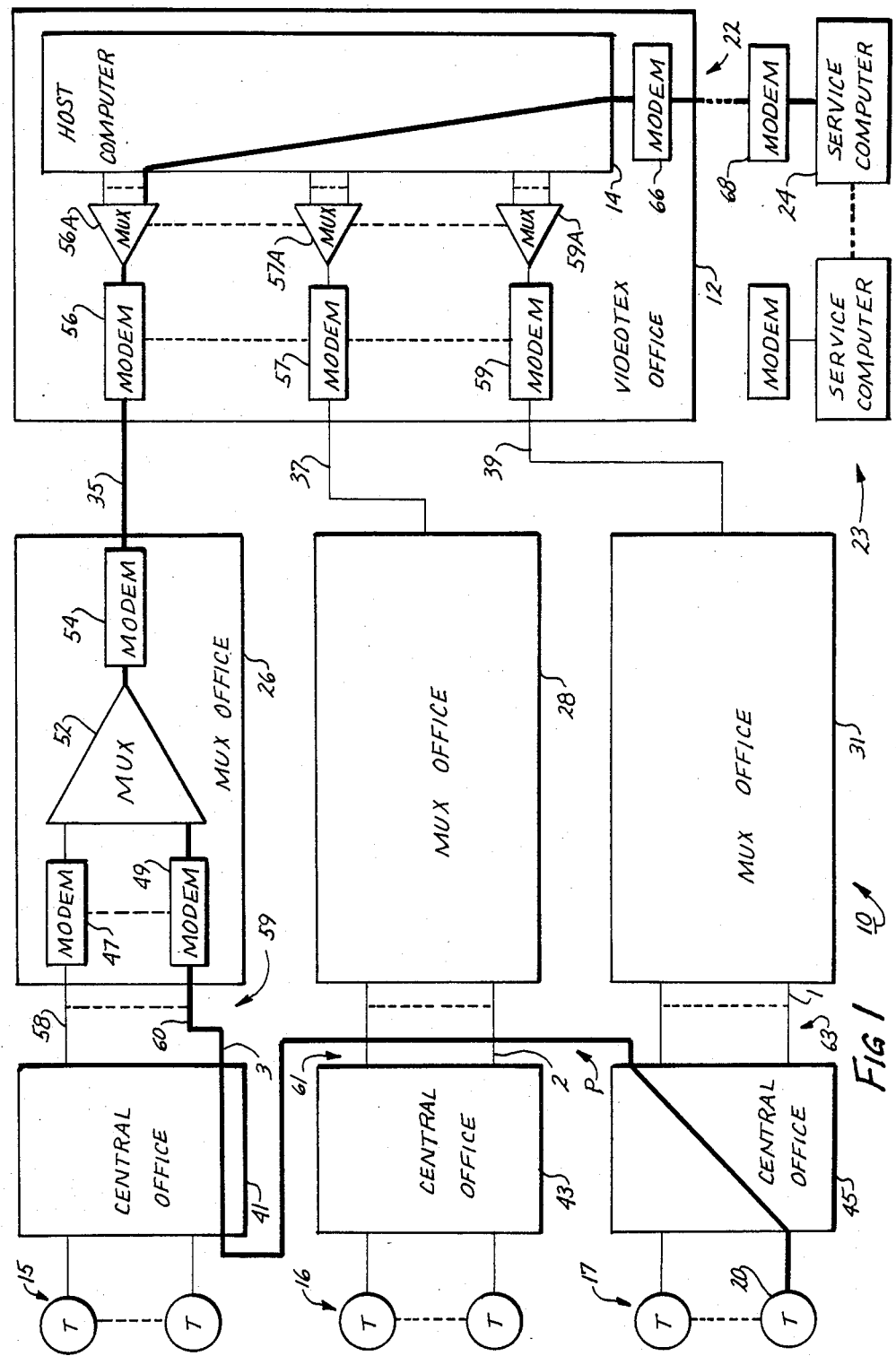
FIG. 1 is a functional block diagram of the information retrieval system of the present invention.
Figure 2:
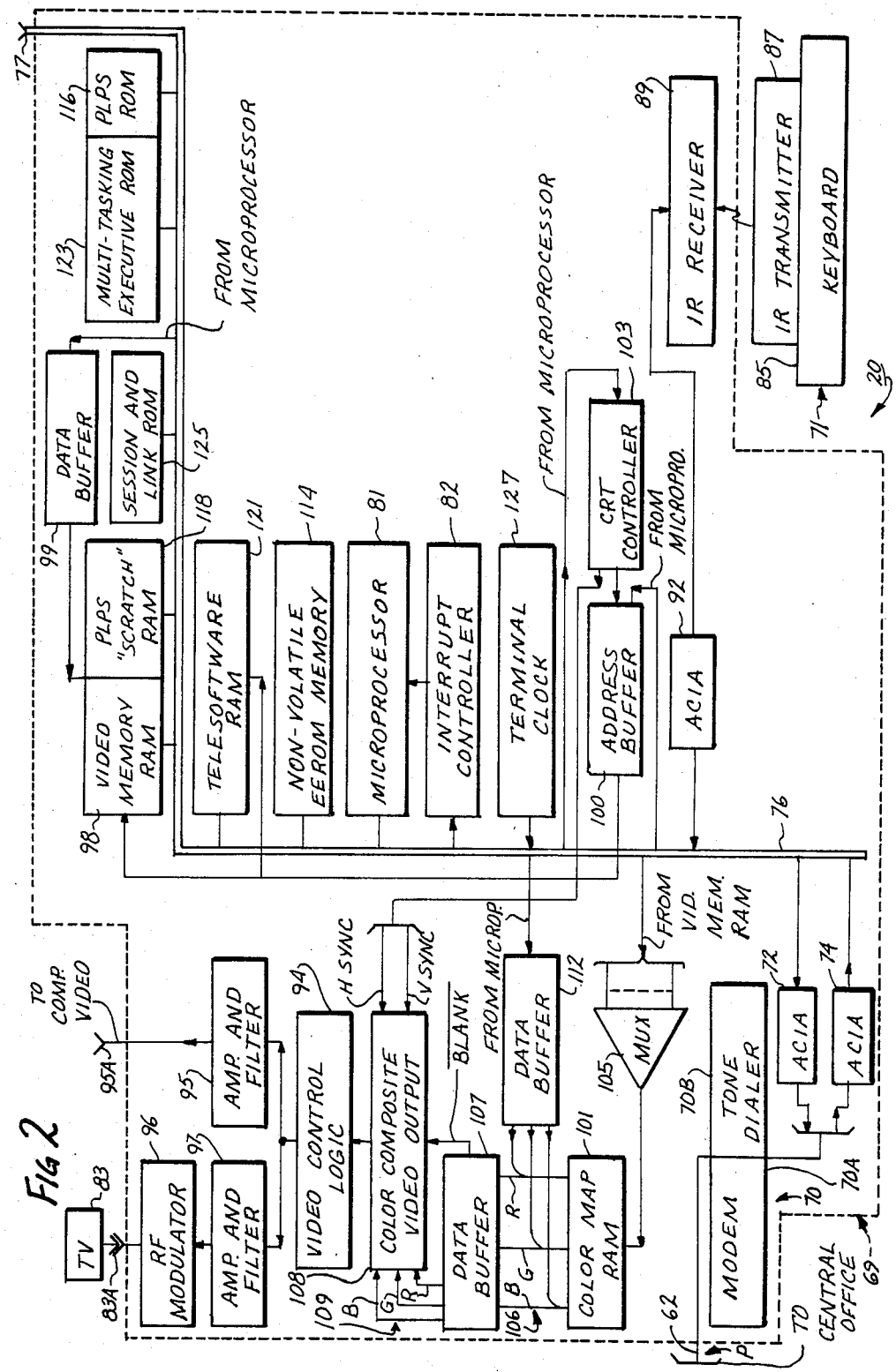
FIG. 2 is a functional block diagram of one of the terminals of the system of FIG. 1.
Figure 3:
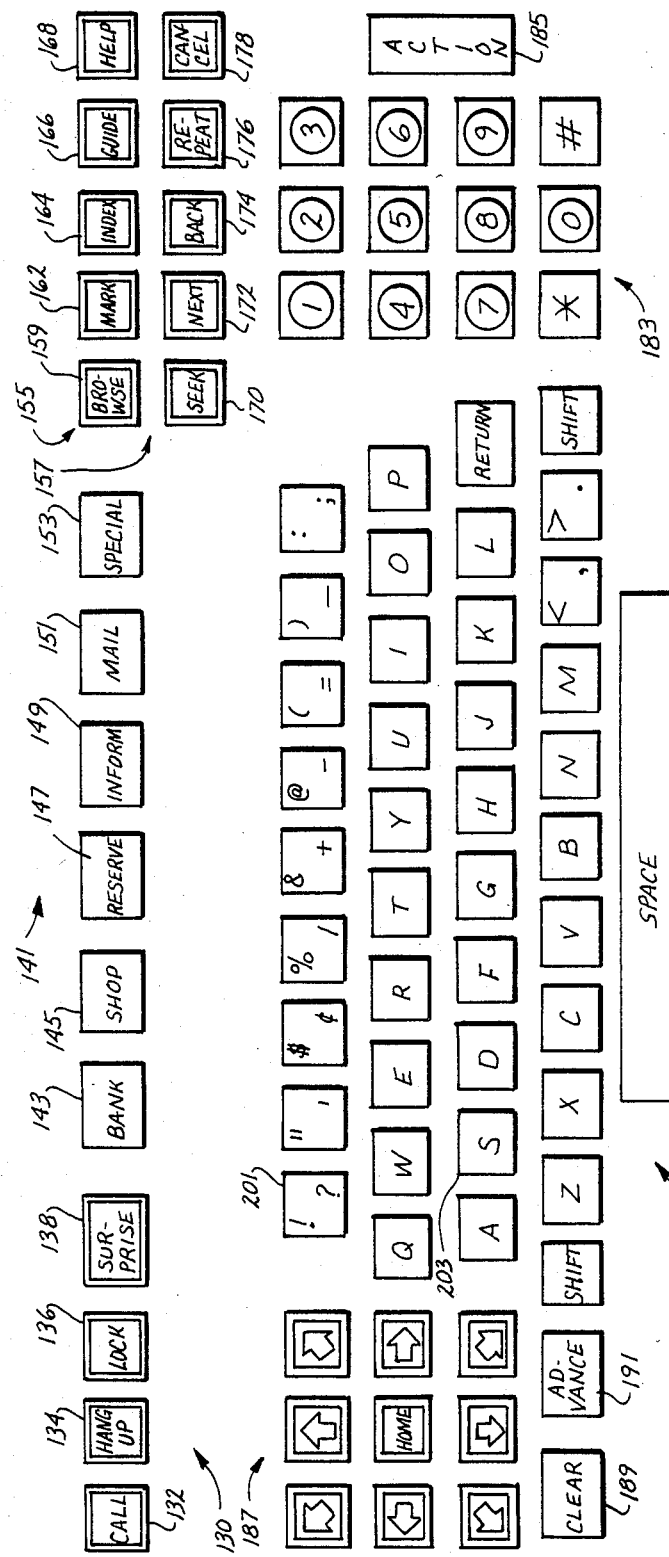
FIG. 3 is a face view of the keyboard unit of the terminal of FIG. 2.

Referring now to the drawings, and more particularly to FIGS. 1, 2 and 3 thereof, there is shown an information retrieval system 10, which is constructed according to the present invention. While the system 10 is shown and described as being a videotex system, it will become apparent to those skilled in the art that the inventive system 10 may also be other types and kinds of information retrieval systems. The hereinafter detailed description of the present invention is organized according to the following outline:

I. SYSTEM
II. TERMINAL
  (a) Detailed Hardware Description
III. KEYBOARD
IV. GENERAL OPERATION
V. SPECIFIC OPERATION
  (a) Initial call operation
  (b) Automatic Re-dialing Operation
  (c) Telesoftware—Multi-tasking Processing
  (d) Telesoftware—Multiple graphics control
VI. TERMINAL FIRMWARE
VII. EXECUTIVE PROGRAM
VIII HOST COMPUTER SOFTWARE - SESSION/LINK Referring now to FIG. 1, the system 10 generally comprises a videotex office 12 having a host computer 14 for communicating with a plurality of groups 15—17 of geographically widely-distributed terminals such as the terminal 20.

The videotex office 12 extends from a calling one of the terminals, such as the terminal 20, a gateway communication path, such as over the telephone lines 22 via a telephone central office (not shown), to a selected one of a plurality of service computers generally indicated at 23, such as the service computer 24. In this manner, the terminal 20 can communicate directly with the remotely located service computer 24, which may be a bank or store computer where the user of the terminal 20 has an account. Thus, the user is enabled to access the computer 24 to transact desired business.

In order to communicate economically with the host computer 14, a plurality of similar multiplexing offices, such as the office 26, 28 and 31, concentrate a large number of communication paths, to a much smaller number of communication paths 35, 37 and 39, extending between the outlets of the respective multiplexing offices 26, 28 and 31, and the respective inlets of the videotex office 12. The paths 35, 37 and 39 are leased dedicated telephone lines, which carry a relatively large number of or any other multiplexing arrangement multiplexing data calls from the terminals. Thus, the telephone charges for the operation of the system 10 is greatly reduced. The paths 35, 37 and 39 may also be value added circuits in a packet switched network or microwave or infrared link.

The cost savings also results from the fact that the multiplexing offices are distributed uniformly and appropriately over the service area of the videotex office 12. Moreover, the terminals are arranged in the groups 15-17, which are coupled to conventional telephone central offices 41, 43 and 45 for extending connections to the multiplexing offices 26, 28 and 31.

In this manner, the multiplexing office can be either closely located relative to the corresponding central offices, or can be physically located therewithin. As a result, a call from one of the terminals is charged by the telephone company as a local telephone call, because of the relatively short, direct distances involved.

Thus, because of the short distances involved, the call from a terminal through the central office to the multiplexing office, is charged at a minimum rate. Also, the connection between the multiplexing office and the videotex office is charged at a low rate, because of the economical use of multiplexed leased telephone lines. Therefore, the overall charges are maintained at low rates, regardless of the location of the terminals relative to the host computer 14.

Considering now the multiplexing offices, each one of them is similar to one another, and thus only the office 26 need be described in greater detail. The office 26 includes a group of modems, such as the modems 47 and 49, which have their outputs connected to the inlets of a multiplexer 52. The outlet of the multiplexer 52 is connected to the inlet of a modem 54, which has its outlet connected to the single communication path 35.

A modem 56 in the videotex office 12, is one of a group of input modems, such as the modems 57 and 59 connected to the respective lines 37 and 39, and the modem 56 receives the data from the communication path 35. A group of multiplexers, such as the multiplexers 56A, 57A and 59A, de-multiplex the outputs of the respective input modems 56, 57 and 59 for supplying the information to the host computer 14.

The inlets of the modems, such as the modems 47 and 49, are connected to telephone communication lines, such as the lines 58 and 60 extending between the central office 41 and the respective modems 47 and 49. The telephone lines 58 and 60 are part of a hunt group 59 of lines extending between the central office 41 and the multiplexing office 26. In this regard, the central office includes conventional equipment (not shown), which automatically hunts for the first idle line, when a call is made to a single telephone number for the hunt group. The multiplexing offices 28 and 31 include similar other hunt groups 61 and 63 of telephone lines extending from their respective central offices 28 and 31.

Considering now a communication path extending from a calling terminal and a service computer. The path to be described is shown in heavy lines in FIG. 1. Assume that the user of the terminal 20 desires to perform a service transaction, utilizing the service computer 24, which may be, for example, the computer located at the user's bank. Assume further that all of the lines for both of the closer multiplex offices 28 and 31 are busy, and thus the office 26 must be used. It should be noted that the actual establishment of these connections is hereinafter described in greater detail.

The communication path indicated generally at P extends from the terminal 20 over a telephone line 62 through the central office 45, over a telephone line 64 to the central office 41. From there, the path P extends through the central office 41, over the telephone line 60 (or an internal line, if the multiplexing office 26 is co-located in the central office 41) to the input to the modem 49, which has its output multiplexed by the multiplexer 52, with the outputs from the other multiplexers in the office 26.

The multiplexed output of the multiplexer is connected to the input to the ouput modem 54, which, in turn, transmits the multiplexed data signals over the line 35 to the modem 56 in the videotex office 12.

From there, in response to user information keyed into the terminal, the communication path P extends to the input of a multiplexer 56A, and from there to the host computer 14. The computer 14, in turn, communicates over an output modem 66 via the telephone line 22 to a modem 68 to the service computer 24, thereby completing the communication path P.

It should be understood that the portion of the communication path P extending between the terminal 20 and the videotex office 12, is also referred to as a communication line, since the terminal 20 communicates with the host computer 14 over this portion of the path P. The portion of the path P extending between the videotex office 12 and the service computer and including the telephone line 22, is also referred to as a gateway path, or simply a gateway. As desired, the terminal can communicate with the host computer 14, as well as the service computer.

While the presently preferred form of the present invention employs telephone connections to serve as the communications path, it will become apparent to those skilled in the art that other forms of communication paths may also be employed. For example, microwave links may also serve as communication paths for the system 10.

In the preferred form of the present invention, the host computer is a Honeywell DPS 8, which employs a CP-6 operating system.

Referring now to FIG. 2, the terminal 20 includes a decoder 69 and a keyboard unit 71, and communicates with the host computer 14 over the communication path by means of a modem/dialer 70, which in turn communicates by a pair of asynchronous communication interface adaptors 72 and 74 to and from a bus 76. The bus is a 28 bit parallel, 8 bits for data and 20 bits for the address information. The interface adaptors convert between parallel bus information and serial information for the telephone line communication path P between the host computer 14 and the terminal 20.

A bus extender connector 77 enables peripheral devices, such as a printer (not shown), a disk drive (not shown) or the like, to be coupled directly to the terminal, without the need for special interface circuits. Thus, the terminal can be expanded for greater utilization thereof, if desired.

A microprocessor unit 81 communicates with the bus to control the functioning of the decoder of the terminal. An interrupt controller 82 responds to the microprocessor 81. Examples of interrupts include the initiation of keyboard information, the initial receipt of communication line information, and others.

The decoder 69 communicates with the host computer 14 to display information on a television screen (not shown) of a television receiver 83. The decoder receives manual input information from a keyboard 85 of the keyboard unit 71 over an infrared link, which comprises an infrared transmitter 87 of the unit 71 and an infrared receiver 89 of the decoder 69. The transmitter 87 includes a conventional semiconductor laser diode (not shown), which transmits a semidirectional infrared signal to a conventional infrared-sensitive diode receptor (not shown) in the decoder receiver 89, whenever the cone of transmission is pointed in the general direction of the decoder 69. In this manner, the keyboard unit 71 can be used remotely from the decoder 69 by means of a wireless infrared radiation link.

An asynchronous communication interface adaptor 92 couples the information from the I.R. 89 receiver to the bus 76.

In order to control the formation of information for the television screen, a TV control logic 94 causes the sending of pixel information to the television receiver 83, via a jack 83A. The video set can either be a conventional television receiver, or a component video set (not shown). In the latter case, the signals are sent directly thereto via an amplifier and filter circuit 95 to a jack 95A. In the case of the conventional television receiver 83, the signals from the TV control logic 94 are sent to an R.F. modulator 96 via an amplifier and filter circuit 97, which modulator in turn is coupled to the conventional television receiver for operation on either channel 3 or channel 4 thereof.

A video or screen random access memory 98 is connected to the bus 76 and is accessed in either bytes (8 bits) or nybbles (4 bits). A data buffer 99 writes data received from the microprocessor 81 via the bus 76 in either bytes or nybbles. An address buffer 100 receives address data from the microprocessor 81 via the bus 76, and, in turn, supplies it to video memory 98 for addressing it. The video or screen random access memory 98 contains information representing the picture elements (pixels) stored therein in a conventional dot matrix arrangement. This information also determines the positioning for the screen. In this regard, the control logic 94 responds to the information in the video RAM memory 98 to formulate the pixel information for the television receiver 83.

The pixels are areas of light or dark on the video screen. Each pixel is represented by 4 bits of information stored in the video random access memory 98.

A color map memory 101 stores color information, which combines with the pixel information stored in the video memory 98 to determine the color of the pixels.

The video memory 98 is connected to the bus 76 so that the microprocessor unit 81 can control the content and operation of the video memory.

A CRT controller 103 receives data from the microprocessor 81 via the bus 76, for the purpose of controlling the graphic display for the receiver 83.

In this regard, during normal operation, the microprocessor 81 receives a stream of data from the host computer 14 via the path P, the modem/dialer unit 70, the ACIA unit 74, and the bus 76; and continuously, on the fly, generates graphic display information for the CRT controller 103 under local firmware control, as hereinafter described in greater detail.

In order to provide the proper information for the video control logic 94, the controller 103 causes address data to be sent to the video memory 98 via the address buffer 100 and the bus 76, to cause the graphic information, arranged in the three color bit-plane configuration, to be read from the video memory to a multiplexer 105, via the bus 76.

The multiplexer 105 receives 32 data bits of information at a time, and, in turn, gates four bits (a nybble) to the color map memory 101. The four bits represent a single color dot.

There are three outputs, generally designated 106 and individually designated B, G and R, from the color map memory 101 and presented to a data buffer 107. The outputs each comprise four bits of information. The three outputs represent the respective three colors of blue, green and red.

A color composite video output circuit 108 receives three color outputs, generally designated 109, and also specifically designated B, G and R, representing the same colors received from the memory 101.

The video output circuit 108 receives the color outputs 109, and a signal $\overline{BLANK}$ from the color map memory 101, to, in turn, supply the necessary information to the video control logic 94. The CRT controller 103 also supplies the horizontal and vertical synchronization signals directly to the video output circuit 108, for mixing with the video picture information and supplied in synchronism therewith.

In order to utilize the bit plane memory information built up and stored in the memory 98, under microprocessor control, the video memory 98 is addressed by sending address information thereto via the address buffer 100 and the bus 76. As a result, groups of 32 bits of color data are transferred, repeatedly and sequentially via the bus 76 to the multiplexer 105, which in turn, presents four bits (one nybble) of the information to the color map memory 101 for storage therein temporarily, before moving to the video output unit 108.

The red, green and blue color dot pixel information is transferred from the color map memory 101 to the video output unit 108 via the buffer 107 in a sequential mode of operation. The unit 108 causes a graphic screen resolution for the television receiver 83, of 256 horizontal pixels by 200 vertical pixels.

The sequence commences by the controller 103 sending a horizontal synchronization signal HSYNC to the output unit 108. Thereafter, 256 pixel information elements are transferred sequentially from the color map memory 101 via the data buffer 107 to the output unit 108. A $\overline{BLANK}$ is also supplied to the unit 108.

After the last element of pixel information is received, another horizontal sychronization signal is sent to the video output 108, followed by another such series of color dot pixel information elements being transferred with the associated $\overline{BLANK}$ signal. After this operation is repeated 200 times, a vertical sunchronization signal VSYNC is sent to the output unit 108. This entire operation can then be repeated.

This sequence of information is, in turn, supplied from the output unit 108 to the control logic 94, and from there, to the RF modulator 96, via the amplifier and filter unit 97, for transferring to the television receiver 83 to provide the desired graphical display on the screen thereof.

A data buffer 112 is adapted to supply color data information from the microprocessor 81 to the color map memory 101 for altering the information stored therein. In this manner, the graphical presentation can be quickly altered, and thus, certain effects, such as animation, can be conveniently realized.

An electronically erasable read only memory (EEROM) 114 stores terminal identification information, telephone numbers for automatic calling purposes, and host managed data. The memory 114 is used to store telephone information for enabling the terminal 20 to set up an initial telephone call to a particular multiplex office port for establishing a connection to the host computer 14, whereby the terminal can send terminal identification information to alert the host computer 14 to the fact that this particular terminal is now functional. The host computer then initialized the newly functional terminal by downloading other telephone information for storage in the memory 114. In the event a particular port of a multiplex office is busy, other connections may be established.

In this regard, a plurality of such telephone numbers are stored in the non-volatile memory 114 of the terminal 20, because if one of the telephone lines is busy, the next geographically closest telephone line is then dialed automatically under firmware control, in the terminal 20.

A PLPS read only memory 116 stores videotex presentation level protocol syntax firmware for the terminal 20, and communicates with the other subsystems of the terminal 20 via the bus 76. A PLPS "scratch pad" random acces memory 118 communicates with the memory 116 via the bus 76. The video memory 98 and the memory 118 are collectively referred to as "main memory".

A telesoftware random access memory 121 stores downloaded software programs from the host computer 14. The telesoftware program is sent from the host computer via the communication path P (FIG. 1), the modem/tone dialer unit 70, the ACIA unit 74, the bus 76, and via the microprocessor 81 to the memory 121. The telesoftware is used to control the operation of the terminal 20, either independently of the host computer 14, or in conjunction therewith. The memory 121 is addressed by address information received from the microprocessor 81 via the address buffer 100.

A read only memory 123 stores a multi-tasking executive firmware program for the terminal 20 for controlling its functioning, as hereinafter described in greater detail. Also stored therein are the keyboard handler firmware, the input/output handler firmware, and the power on page firmware.

A session and link read only memory 125 stores the session and link firmware for the terminal 20, as hereinafter described in greater detail.

The session firmware program controls the sending of data to the host computer 14. It also oversees the reception of data from the host computer. In this regard, it directs the flow of incoming data within the terminal. The link program starts and stops the flow of data to and from the host computer, in the event that either the terminal or the host computer should be unable to accept the information at the current rate. The link firmware program controls the communication protocol. It determines data flow control, in that it controls the speed of the flow of data.

The data is first subjected to the link program layer, and then to the session program layer.

A terminal clock 127 provides the necessary timing signals for the various terminal subsystems via the bus 76.

During the initial call dialog between the terminal 20 and the host computer 14, the host computer requests and then receives the terminal identification information and looks up the information in the table stored therein to determine whether or not the terminal is a maximum convenience terminal. If so, the host computer looks up in the table in the host computer to learn the user's identification and the user's password. The host computer then causes a master index screen to be displayed on the television receiver 83 via the terminal 20. The master index requests the user to determine which type of service is desired. In this regard, it requests the user to press one of the service keys.

If the user has requested maximum security, instead of looking up the information in the table, the host computer causes the terminal to display a request of the user to input the user's identification number and the user's password. Once this has been accomplished, the host computer checks the information entered to determine whether or not the user is authorized. If the user is authorized and the terminal is not locked, the host computer 14 causes the terminal to display the master index.

In either the maximum convenience or the maximum security modes of operation, once the initial steps have been taken, the terminal 20 can be used to gain access to the host computer 14 and the gateways which can be established therefrom.

II. (a) Detailed Hardware Description

The modem 70A is a conventional two-way simultaneous communication device for communication with the host computer 14 over standard telephone circuits. The modem has a receive channel operating at 1200 baud for data from the host computer to terminal. The carrier frequencies are: Mark=1200 Hz, Space=2200 Hz.

A transmit channel is provided for operating at 150 baud for data from the terminal 20 to the host computer 14. The carrier frequencies are: Mark=387, Hz, Space=487 Hz. Automatic dialing is provided for both Touch-Tone and rotary dial circuits. A call waiting feature is implemented by timing the loss-of-carrier period. (Refer to the description hereinafter for operational message consideration.) Echo suppression (if required) is the responsibility of the network. Failure-to-connect is detected by an absence of the carrier. This condition can occur from ringing, busy, or answered-without-carrier events.

Modulated RF and composite outputs are provided at the respective connectors 83A and 95A for connecting to the standard color, or a standard black and white TV receiver on channels 3 or 4 (switch selectable). The RF output signal complies with the NTSC specification. The specification is promulgated by the Federal Communications Commission, Office of Science and Technology, "NTSC Rules for Radio Broadcast, Volume 3, Part 73, Section 73.682," U.S. Government Printing Office, Washington D.C.

The composite video signal complies with the RS 170 specification, which is the Electric Industries Association, "Electrical Performance Standards - Monochrome Television Studio Facilities," RS-170, Electronic Industries Association, Engineering Department D.C., 1957.

The keyboard 85 is a flat membrane type, with an embossed surface around each keycap to enable finger positioning, and is housed as a cordless unit, detachable from the main enclosure for the decoder 69, which enclosure confines the terminal electronics. For additional information concerning the terminal enclosure, reference may be made to the first two hereinbefore-mentioned cross-referenced, co-pending U.S. patent applications.

A maximum of 256 key codes are possible. However, only those listed are supported.

Audio feedback via a conventional audible annunciator (not shown) located in the decoder 69, is activated by a conventional beep timer (not shown). One beep tone (400 Hz) for 70 milliseconds indicates that a keystroke of the keyboard 85 has resulted in a code being received by the decoder 69 without error. The second beep tone (800 Hz) for 70 milliseconds is used for error conditions. A rear-mounted volume control (not shown) is also provided.

The 800 Hz beep tone is activated, if an ASCII BELL Code is received from the host computer 14.

The terminal 20 is also provided with a keyboard repeat function. When a keyboard depression occurs for more than a half second, the associated code is transmitted from the keyboard 85 at a rate of 10 per second until key release. In the event of a two key rollover, the keyboard 85 responds to each key depression, provided that no more than two keys depressions occur simultaneously. If a second key depression occurs while the character codes for the first key depression are being transmitted, transmission of the first key code ceases and only one code for the second key depression is transmitted (with repeat function disabled), until one of the two key depressions is released. After release of one of them, the remaining key depressions cause the engagement of the repeat function. A full character code is always transmitted.

Using the IR transmitter 87 and the IR receiver 89, data is transmitted to the decoder 69 (at an effective rate of 150 baud) by means of high frequency infrared energy pulses (e.g. pulsed infrared light beam). The range of transmission is approximately 30 feet. The operational radiation cone is approximately 60 degrees.

Data to transmitted to the host computer 14 starts to exit the terminal within 85 milliseconds following a key depression in the PLPS mode, provided that transmission has not been disabled by the host computer 14 (FIG. 1). The complete key character exits the terminal within 145 milliseconds.

Power for the keyboard unit 71 is supplied by a non-rechargeable battery (not shown). The keyboard design minimizes battery drain. Normal battery life is approximately one year or greater, based on 5,000 keystrokes per day.

The following is a list of integrated circuits, which are representative examples of units used for the various subsystems of the termnal 20:

| Subsystem | Integrated circuit |
|---|---|
| Modem 70A | TCM3101 |
| Tone dialer 70B | MK5089 |
| ACIA 72, 74, 92 | SY6551 |
| Video control logic 94 | 74123, LM1889 |
| Video memory RAM 98 | 4416-2 |
| Data Buffer 99 | HFE4052B |
| Address Buffer 100 | HC153 |
| Color Map RAM 101 | 2148 |
| CRT Controller 103 | SY6545-1 |
| Multiplexer 105 | HC166, HC153 |

-continued

| Subsystem | Integrated circuit |
|---|---|
| Data Buffer 107 | HFE 4052B |
| Color composite video output 108 | LM1886 |
| Data buffer 112 | HFE4052B |
| Non-volatile EEROM memory 114 | SY2802E |
| PLPS ROM 116 | SY23256A |
| PLPS "Scratch" RAM 118 | 4416-2 |
| Telesoftware RAM 121 | 4416-2 |
| Multi-tasking executive ROM 123 | SY2365A |
| Session and link ROM 125 | SY2365A |

It should be understood that one skilled in the art may employ a plurality of each of the above-identified integrated circuits to serve the appropriate terminal subsystem, in order to provide the desired suitable capacity therefor. For example, a plurality of the ROM and RAM circuits are employed in an implemented embodiment of the system 10, to provide the desired memory storage capacity.

III. KEYBOARD

Referring now to FIG. 3, there is shown a membrane panel 128 of the keyboard 85 (FIG. 2).

In the upper left hand corner of the panel 128, a set of user command keys are provided and are generally indicated at 130. These keys comprise a CALL key 132, a HANG UP key 134, a LOCK key 136 and a SURPRISE key 138. These user command keys 130 initiate and terminate the use of the terminal 20.

At the central upper portion of the panel 128, there is disposed a set of service keys generally indicated at 141 for enabling the user to initiate service functions as identifed on the keycaps. The initiation occurs by a single keypress.

The service keys 141 comprise a BANK key 143, a SHOP key 145, a RESERVE key 147, an INFORM key 149, a MAIL key 151 and a SPECIAL key 153. By pressing any one of the service keys, such, for example, as the BANK key 143, the communication path P is established automatically from the terminal 20 through the host computer 14 to the desired bank service computer 24. After pressing the BANK key, the user is enabled to perform banking transactions.

In the upper right hand portion of the panel 128, there is a row of aid keys generally indicated at 155, and below it, a row of work keys generally indicated at 157.

The Aid keys comprise a BROWSE key 159, a MARK key 162, an INDEX key 164, a GUIDE key 166, and a HELP key 168. The work keys comprise a SEEK key 170, a NEXT key 172, a BACK key 174, a REPEAT key 176 and CANCEL key 178.

A full QWERTY set of keys are generally indicated at 181 and are located at the central portion of the panel 128. To the right thereof, a set of function keys are generally indicated at 183, are each labelled 0-9, together with "*" and a pound sign. They are arranged in four rows and three columns.

An ACTION key 185, disposed to the right of the function keys 183, is used to enter data into the terminal 20. To the left of the QWERTY keys 181, there are disposed a set of cursor control keys 187, which enable the movement of the cursor to be controlled by the user. Disposed therebelow, are a pair of keys labelled CLEAR and ADVANCE, indicated respectively at 189 and 191.

IV. GENERAL OPERATION

Considering now the operation of the system 10 with reference to FIGS. 1-3, the system 10 is initially activated by pushing a power-on switch (not shown) for the terminal. Assuming now for example that the user wishes to perform a banking function, the user pushes the CALL key 132 for the terminal 20. This action causes the modem-dialer 70 to send a telephone number to the central office 45 via the telephone line 62.

As a result, a telephone connection, such as the communication path P, is established between the terminal 20 and the host computer 14. By extending this connection to the host computer, it recognizes the connection and establishes an identification sequence. In this regard, the host computer 14 sends a message to the terminal 20 in the form of a session inquiry.

The terminal 20 recieves the inquiry message, and then returns a message to the host computer 14 to establish the identity of the terminal.

The message includes the model number, serial number, and the manufacturer's identification of the terminal. The manufacturer's identification number and the model number determine what type of terminal is requesting service. In this regard, the call could be coming from any one of a large number of the terminals. The manufacturer's identification indicates that the terminals 20 is one of the terminals associated with the videotex office 12, as contrasted to independent personal computers (not shown) requesting service of the videotex office 12.

If no user password is used, the identity of the user is then associated with the particular terminal serial number when the host computer 14 performs a table lookup sequence. In this manner, the user is then logged on to the host computer 14.

The user then presses the BANK key 143 (FIG. 3). This action causes the host computer 14 to receive a message from the terminal 20 and an index page is then selected. The information indicative of the index page is then sent to the terminal 20, which in turn displays on the television receiver 83 a menu or index page of banks for selection by the user. The user then pushes one of the number keys of the function keys 183 to select one of the banks identified on the index.

Thereafter, the user presses the ACTION key 185 for for enabling transmission of the selected number key information to the host computer.

This information is transferred to the host computer 14, which in turn, establishes the selected gateway connection 22 from the host computer to the selected bank computer. The gateway connection 22 is the connection extending between the host computer 14 and the bank service computer 24.

Alternatively, without the need for the use of a menu page, if desired, the host computer 14 could establish a gateway connection to a particular bank when the user simultaneously pushes the BANK key 143 and the SHIFT key, to in turn connect the host computer directly to the selected bank computer. In this regard, instead of using the index page selection technique, the host computer 14 could also establish the connection to the desired one of banks in which the user has an account. The user presses the number key; e.g. "2 or the bank name", the SHIFT key, then BANK to identify the desired one of the banks to which the user's terminal is to be connected.

Once the gateway connection is established to the bank computer, the host computer 14 maintains that connection.

In order to perform a disconnect function for disconnecting the gateway connection 22, the bank computer 24 sends information for the terminal to graphically present an index page, offering several selections, one of which would be a QUIT function. Once the user selects the QUIT function to indicate that the banking function is complete, the bank computer 24 sends a message to the host computer 14 for establishing a disconnect cycle of operation. As a result, the host computer 14 then disconnects the gateway connection 22.

Alternatively, the gateway connection can be disconnected when the user pushes another service key, for example, the SHOP key 145. When this is done, the host computer 14 disconnects automatically, the bank gateway connection 22, and then commences the cycle of operation for the new service function.

Additionally, the gateway connection between the terminal 20 and the host computer 14 is disconnected when the HANG-UP key 134 is pressed. This action immediately causes a disconnect cycle of operation to occur, and the user is not required to perform any additional operations.

When the HANG-UP key 134 is pressed, a message is sent from the terminal to the host computer 14 to inform it that a disconnect cycle of operation has been selected. Simultaneously, the modem-dialer 70 in the terminal 20 responds to the pressing of the HANG-UP key 134 for disconnecting the telephone connection to the host computer 14.

At the same time, the host computer performs a log-off procedure, which includes posting, disconnecting the gateway, if any, and disconnecting the host computer from the telephone connection with the terminal.

In general, whenever a key is pressed, two characters of information are generated by the terminal and are sent over the telephone line to the host computer. The first character is an ASCII character code. For example, the code may indicate a lower case "n". The second character is an end of text (EOT) character to indicate to the host computer to enter and to commence the function.

The activation characters are treated differently from the regular characters. In this regard, in connection with the activation characters, where there is no NAPLPS protected field, all information is immediately sent to the host computer 14.

The CALL key 132 does not generate two characters for the host computer, instead it generates a signal, which is used by the terminal modem. In this regard, the CALL signal initiates a cycle of operation by the modem-dialer 70, which operation includes dialing the telephone number to the closest available multiplex office for establishing the connection therethrough to the host computer 14.

It should be noted that the CALL key 132 establishes an automatic dialing function, and the HANG-UP key 134 generates an automatic disconnect cycle of operation. The HANG-UP signal is in the form of two characters which are transmitted from the terminal to the host computer 14.

Considering now the LOCK key 136, the LOCK feature enables the user to prevent unauthorized use of the terminal. The LOCK key feature prevents access by unauthorized users to the host computer 14 for utilization of the system 10, by pressing the LOCK key 136, and by subsequently entering a lock password by means of the keys 181 of the keyboard 128.

In this regard, the terminal can be temporarily locked to deny access to the system, in the event that the user decides to leave the terminal and go elsewhere for a short period of time. Upon returning, the user can readily unlock the terminal.

While the terminal is locked, another person can automatically log-on the host computer 14 by pressing the CALL key 132. However, in so doing, a page is displayed on the television receiver 83, indicating that the terminal is locked and requests the current user to decide whether or not the terminal should be unlocked. If the present user is unable to enter the correct lock password, the host computer 14 disconnects automatically.

In operation, in order to lock the terminal, the LOCK key 136 is pressed to generate a two character code, which is sent to the host computer 14. The host computer, in turn, causes the terminal to display a page on the television receiver 83 requesting the user to type in a lock password, and then type it in a second time. The host computer then compares both sets of information. If the two lock passwords do compare and are thus identical, the terminal is locked.

The reason for requesting the lock password to be entered twice is that it is not desirable to display the password for unauthorized persons to see. By typing it twice, the host computer then can ascertain whether or not the lock password was correctly entered. Additionally, there is then no need for displaying the lock password to the user to enable the user to determine whether or not the lock password was correctly entered.

If the two lock passwords do not compare, or if the user presses another key, the lock program executed by the host computer is terminated.

In order to unlock the terminal, the user pushes the CALL key 132, and a page is then displayed on the television receiver 83, indicating that the user has three options.

The first option is to hang up by pressing the HANG UP key 134, to initiate a disconnect sequence of operation. The second option is to unlock the terminal, by entering the proper password and user identity information, which is given to the authorized user when first acquiring the terminal. The third option is to enter a different user identification number, in the event that the current user is not the user who locked the terminal.

The unlocking procedure commences by a page being displayed, which requests the lock password to be entered. The lock password is then entered once, and if correctly done, the host computer 14 then displays the last page, which was previously displayed before the terminal was locked.

The host computer then changes the state to an unlocked condition. In such a condition, the user is free to access the host computer by the easy access method associated with merely pressing the CALL key 132.

The third option of using a different user identity information, is used where a different person, other than the subscriber, desires to use the terminal. By selecting the third option, the new user types in a different user identification number, and then his unique password. By logging-on in this manner, the new user is then charged for the videotex service, similar to a credit card telephone call. If the user password is incorrectly entered on three consecutive tries, the host computer 14 causes a special page to be displayed on the screen, indicating that the person currently operating the terminal 20 is not an authorized user, and is attempting to use the system 10 in an unauthorized manner. The host computer 14 can then disconnect from the terminal 20 in such a case.

It should be noted that the terminal is not completely locked, in that the security log-on feature is available to any user.

In the easy mode, the CALL key 132 is used for automatic log-on. For the secure mode, both the user password, if any, and the user identification information, must be entered, before the user has access to the host computer.

When the initial call is made from the terminal 20 to the host computer 14, the terminal identification information is supplied to the host computer, which in turn stores the information in a table to enable the host computer 14 to determine whether a particular user has chosen either maximum convenience or maximum security.

Therefore, the terminal identification information is permanently stored in the host computer 14. However, the lock password is changed each time, and after it is used, the host computer 14 discards the information.

Should the user decide to press another key, such as the SHOP key 145 or other service key 141, during the locking procedure, the lock program in the host computer 14 is prevented from executing or is "killed". Moreover, the program control in the host computer 14 is automatically transferred to the selected service program.

Considering now the other service functions, each time a service key is pressed, two characters of information (the key code) and the end of text (EOT) characters are sent to the host computer 14. Thereafter, the host computer 14 matches the key code with a table to fetch a page from the host computer memory (not shown). Information is then transferred from the host computer 14 to the terminal 20 to cause it to display the page on the television receiver 83.

Considering now the MAIL, SURPRISE and LOCK keys and their associated functions, when each one of these three functions are initiated, a page of text material is transferred from the host computer 14 to the terminal 20. A program associated with the page is then given control by the host computer 14. The user then is enabled to use the program and its facilities.

Pressing the SURPRISE key 138 initiates the surprise feature, which enables the receiving of a randomly generated message. In this regard, a surprise page is transferred from the host computer 14 to the terminal 20. A program associated with the page is then given control by the host computer 14. The surprise page is displayed on the television receiver, once the SURPRISE key 138 is pressed.

For example, the screen may display the "joke of the day". The page of information displayed on the screen would also ask the user if the user would like to see the joke of yesterday. If so, the SURPRISE key 138 is pressed a second time. By pressing it a third time, the joke of the day before is displayed.

Therefore, the sequencing of the additional displays is under the surprise program control in the host computer 14. In this manner, the surprise message can be changed in accordance with the surprise program control. The surprise program, therefore, can, if desired, be a randomly generated form of information, and can even be a random generation of numbers for display to create a humorous nonsense message.

Additionally, if desired, the surprise message can indicate that a special mail message is available by pressing the MAIL key 151. Alternatively, the surprise program can provide a special message associated with the previous page of text displayed on the television screen. In this regard, for example, if the user had previously been performing a SHOP key function, the surprise program would cause a page to be retrieved from the host computer 14 concerning shopping information, such as special items on sale.

The surprise program counts the number of times the SURPRISE key is pressed, so that a different page of text can be displayed each time the SURPRISE key is pressed.

When the MAIL key 151 is pressed, the host computer 14 sends a page of text to the terminal 20, and the page of text is displayed on the television receiver.

The CANCEL key 178, when pressed, interrupts the execution of a program including the flushing of all enroute page transmissions, or terminate page reception. In this manner, the user can make corrections. The ACTION key 185 causes the generation of a two character message which is sent to the host computer 14 indicating that the host computer is to respond to the previously sent information.

The HELP key 168, when pressed, causes the transferring of a page of helpful information from the host computer 14 to the terminal 20, or so that the terminal 20 can cause the display of the last page. The helpful page is associated with the previously displayed page of text and contains explanations about the information contained in the previous page. For example, if the previous page requested the subscriber to enter the "SSN" information, and the user does not know what the term "SSN" means, the user presses the HELP key to display the help page. The help page then defines the terms on the previous page and explains that "SSN" means "social security number". In this manner, a user is then informed as to the meaning of the words or requests, previously contained in the last page of information.

The user then merely presses the HELP key 168 again, and the last page of text is returned to the television screen.

In the system of the present invention, each page of text has an associated help page. However, in certain types of pages, for example, menu or index pages, a generic help page is displayed to inform the user how to interact with the terminal 20 in regard to the last page of text displayed.

In order to return to the last page of text displayed, the HELP key 168 is pressed. Alternatively, the BACK key 174 is pushed, and the preceeding page of text is then displayed.

When the GUIDE key 166 is pushed, the subscriber is enabled to retrieve a display of information, which display of information is useful to render user guidance in facilitating the operation of the videotex system 10. For example, the guide page is used to explain how to use the terminal 20.

The guide page varies for different users. Each user may have a different manner of using his or her terminal. For example, one user may have the convenient mode of operation, whereas another user may have the maximum security mode of access. The guide pages are, therefore, associated with individual types of terminals, and terminal users.

In operation, when the user presses the GUIDE key 166, a two character message is sent to the host computer 14, which in turn matches the key code signal in a table to determine a page of information to be displayed. The host computer 14 then returns a message to the terminal 20 and instructs the terminal 20 to display the guide pages.

Thereafter, once the user has completed the use of the guide pages, the user then presses either the NEXT key 172, BACK key 174 or the GUIDE key 166. In this regard, the succeeding, preceeding or the page which was displayed immediately prior to pressing the GUIDE key, respectively is then displayed on the television screen.

The INDEX key 164, when pressed, causes the last index page to be displayed.

The MARK function is started by pressing the MARK key 162. The mark function is similar to a bookmark, in that the user can later retrieve the same page of information as previously viewed on the television screen.

In order to mark a page, a coined name, such as "WEATHER" is typed into the terminal 20 for identifying the page. This is a reference operation. Once the name is typed in, the MARK key is pressed.

These actions cause the host computer 14 to store the name in the user's personal table in the host computer memory (not shown). The page address information is stored next to the stored name information to provide an indirect reference.

In the system 10, only ten pages may be stored, and if an eleventh page is attempted to be stored, a message is displayed on the television screen requesting the user to delete one of the previous pages.

A MARK key 162 may be used to bookmark a page, it should be understood that the marked page is not stored in the host memory, but instead, a mark is stored in an appropriate table indicating which page is to be called up at a later date, upon request. In this manner, the desired page may be updated at a later date. In this manner, when the user requests the marked page, the page which is displayed on the television screen is the updated page.

Moreover, it should be noted that in order to access a particular service, such as a weather report, the user presses the INFORM key 149, to cause the display of a weather index or menu. The user must then select a particular city to determine the present weather report.

If the user has previously marked such a page, all of these operations can be eliminated by merely typing in the word "WEATHER" and pushing the MARK key 162. The weather report for the selected city is then displayed on the television screen.

When a question mark key 201 and then the MARK key 162 is pressed, a question mark page is displayed on the screen to illustrate a list of all the names of marks previously stored. In this manner, should the user forget which mark names are stored, the user merely presses the question mark key 201 and MARK key 162 to display the question mark page to refresh the memory of the user.

When the BROWSE key 159 is pressed, a series of pages are sequentially displayed concerning a particular subject. In this regard, since the pages for the system 10 are arranged in a tree configuration, each level of the tree can be sequentially displayed by use of the BROWSE key.

Once this feature is activated, the pages may be "turned" each time the BROWSE key is pressed. Alternatively, the pages can be turned automatically at a predetermined rate, such as at a rate of once every thirty seconds, or at a desired subscriber rate. The automatic browse feature is initiated by first pressing a rate key such as the S key 203 and then the BROWSE key 159. The pressing of the S key 203, indicates the word "slow" for speed, and a timer rate may also be stated, such as "5" then browse to turn pages at a 5 second rate.

Once the BROWSE key 159 is pressed, each one of the index pages for each one of the services is displayed sequentially. Once the desired index page is displayed, such as, for example, the bank index page, the user can then cause the display of additional index pages by making an appropriate selection. The choice made by the user causes an index page to be displayed at a lower level of the tree of pages.

As an example, the user may select a shop index, and then decide that the user is not interested in shopping and would like to review the other possible services, which are available. The BROWSE key 159 is then pressed, and then the other shop index pages are displayed sequentially. The bank index is then displayed, followed by the information index and so on. The entire number of indices are displayed sequentially, each time the BROWSE key 159 is pressed. Once the user decides to proceed with any given service, such as the bank service, the user then makes a selection as indicated on the bank index page to decide which bank is to be selected. For example, the First National Bank may be selected, and if so, the First National Bank index page would then be displayed.

Assuming that the user decides that another bank would be more suitable after the First National Bank index page is displayed, the BROWSE key 159 can then be pressed by the user, and the next bank index page would be displayed. Thereafter, each and every bank index page could be displayed, by repeatedly pressing the BROWSE key 159.

In the videotex system 10 there are several index pages which are relational pages. In this regard, unlike an ordinary index page where a choice or selection made by the user results in the display of a single page, a relational index page enables a series of pages to be displayed on the screen, each one of which is related to the original choice made by the user.

Once the user enters his or her choice, that choice is communicated to the host computer 14 and stored in appropriate memory therein. Thereafter, an appropriate page is displayed on the television screen. If that page is not acceptable to the user, or alternatively, if the user would like to see additional pages related to that same choice or selection, the user presses the NEXT key 172, and another page bearing information concerning the same interest as expressed in the intial choice, is then displayed.

This process is repeated as long as there is a link to another page having the same interest or choice designation as originally stored.

After the last relational index page is displayed, a page is displayed, indicating that there are no additional pages relating to the user's chosen interest. By pressing the NEXT key 172, the original relational index page is displayed. In this manner, the user can then choose another interest to gain access to all pages relating to that interest.

By pressing the REPEAT key 176, the same page is then retransmitted displayed by the television screen. In this regard, the REPEAT key is pressed, whenever it is desirable to have a better copy of the page displayed. This is accomplished by causing the host computer 14 to send the same page to the terminal 20 so that another copy of the same page can be displayed.

The service keys 141 comprise the BANK 143, the SHOP key 145, the RESERVE key 147, the INFORM key 149, the MAIL key 151 and the SPECIAL key 153. The BANK key 143 enables a gateway to be established to the bank computer such as the service computer 24, for enabling the user to perform banking functions. Similarly, the SHOP key 145 can be pressed by the user to enable a gateway to be established to a particular shop computer. In this regard, the user is able to do his or her shopping by communicating directly with the store's computer.

The RESERVE key can be pressed to cause information to be displayed on the television screen concerning the making of reservations for airplanes, theatrical events, or the like.

By pressing the INFORM key, news, sports or other information can be displayed on the television screen. In this regard, there is no limit on the number of pages of information that can be displayed. The SPECIAL key is used to initiate a display of information of a miscellaneous nature. In this regard, private data bases may be accessed for additional charges. For example, up-to-the-minute stock reports could be presented for an additional monthly charge.

The ADVANCE key 191 is used, to cause the user input cursor to move to the next NAPLPS unprotected field displayed on the television screen. By pressing the SHIFT key simultaneously with the ADVANCE key, the cursor moves to the previous field as displayed on the television screen.

The function keys 183 can either be used alone, or can be used in combination with the NAPLPS macro information loaded into the terminal memory for each key. When the SHIFT key is used, in combination with the functions keys, the associated NAPLPS macro is activated.

When the CALL key 132 is touched followed by touching the ACTION key, an auto-dialing sequence is initiated for connection from terminal to the host computer 14. Alternatively, the user may touch the CALL key 132, then type in a phone number and press the ACTION key, which initiates dialing.

Once connection is established with the videotex office, the log-on sequence is started, and a service inquiry is sent to the terminal. The terminal 20 responds by sending its internally stored ID number to the host computer.

When pressed, the HANG UP key 134 causes the sending of a "disconnect" code to the host computer, invoking the log-off sequence. The time of log-off is stored for billing.

The SEEK key 170, when preceded by a keyword, invokes the keyword search program. If there is only one page with the given keyword, the user is shown that page. If there is more than one, an index page is generated with the available choices displayed. This index page is not stored on the index or back stack. Touching the SEEK key with no preceding keyword causes the index page generated by the previous SEEK operation to be re-displayed. If no SEEK operation had been previously executed, no action occurs.

The GUIDE key 166 displays the system guidebook—an explanation of the keys, functions, services and the system, in general. Presssing the key a second time causes the return of the user to the page where he or she was viewing prior to entering the GUIDE operation.

Touching the NEXT key 172 causes the display of the next page of a sequence, following a link on the present page. If no link is defined, as may be the case on an index page (where there may only be choices), a message appears on line 20 of the screen, stating that NEXT is an invalid choice. If the link is defined, but the page does not exist, a message appears on line 20, and a message is sent to the production staff informing them of the missing page and of the page with the bad link.

Each user's sequence is maintained in a stack of page addresses. When a user touches the BACK key 174, the page previously displayed is shown with the exception of service program pages, overlay pages and generated keyword index pages. The GUIDE and HELP functions have associated therewith, an individual corresponding separate stack for this purpose. The BACK key 174 can be used successively until the stack, which is 63 pages long, is depleted. At that time, the last page is re-displayed, along with an explanatory message on line 20. To the user, the BACK key is the easiest way to recover from an error of pressing the wrong key.

Alphabetic characters, number 0–9 and punctuation marks are used for choices or data entry. They do not have associated functions. The normal appearance of the alpha keys 181 is lower case. As in a typewriter, shift, by either pressing the left shift key 182 or the right shift key 184, with a letter displays upper case, or the upper key cap symbol. When used for choices or page selection, upper and lower case letters are treated the same.

To obtain the special functions F1–F10, the 1–10 numeric keys 183 are shifted. The special functions F1–F10 are not yet specified. These function keys are directly related to the NAPLPS Macros M0–M9. The Macros are capable of transmitting information to the host computer 14 or causing a specific picture to be drawn on the screen. For example; answers to a quiz could be "hidden" from the user by sending them to the terminal using the same color for the text as the background color. Touching one of the special function keys can cause a macro to be executed which can change the color of the text and thus reveal the answers.

V. SPECIFIC OPERATION

When the terminal 20 is first installed, it is provided with a terminal identification information, which includes the manufacturer's identification number, a model number and the serial number. There is also included a check sum.

The terminal identification number is stored in the EEROM memory, together with an initial telephone number for making the first telephone call to the host computer 14, which call is performed automatically to inform the host computer of the that the terminal 20 has now been activated for service.

V (a). Initial call operation

Considering now the first call made from the terminal 20 to the host computer 14, for the purpose of initialing the terminal 20, the terminal 20 is coupled to the telephone line and to the television receiver.

When the terminal 20 is first connected to the telephone line and the television receiver, a call is automatically made to the host computer 14. The host computer determines that this is an initial call, by decoding the telephone number, or by determining that the call was extended through a certain port of a multiplexing office assigned for inital calls only.

Once this initial telephone call is made and a telephone connection is established to the host computer 14, a host/terminal dialog commences. During this dialog, the terminal 20 sends a message to the host computer as to the location of the terminal 20. In this regard, the host computer 14 sends the message to the terminal 20 to cause an index page to be displayed on the screen of the television receiver. The index page requests the location of the terminal. The user then uses the keyboard to cause the terminal to transmit a location message from the terminal 20 to the host computer 14 as to the location of the terminal.

The host computer 14 then decodes the location message. In response thereto, the computer 14 sends telephone number information (call origination information) to the terminal 20 for storage in the EEROM memory therein. This information is in the nature of three or more telephone numbers for the geographically closest multiplexing offices. In this manner, the terminal is able to place automatically calls to the geographically closest multiplexing office in an attempt to minimize the telephone charges from any terminal to the host computer 14.

Referring to FIG. 4, considering now a typical call from the terminal 20 to the host computer 14, once the above-described initial call is completed, the power-on page is first displayed at power-on when the on-off switch is termed on, and whenever the terminal enters the quiescent state following an unsuccessful attempt to contact the system.

As shown in FIG. 5, the call setup page is displayed when the CALL key 132 is pressed, and if the terminal 20 is in a quiescent state. Also, the 21st line of the display is cleared, if the power-on page is displayed. Note that the text for a call setup message overlays the power-on page portion, and the power-on page may or may not be present. If carrier has been sensed (telephone answered) by the modem/dialer unit 70, but no message was received from the host computer 14, the screen will have been restored to the initial power-on page display.

As shown in FIG. 6, the call progression page is displayed whenever the ACTION key 185 is pressed following the display of the call setup page. If a number is typed into the status line, the number above the word "DIALING" is cleared, and the typed number is dialed. The number that is dialed is displayed below the word "DIALING".

Note that the text for the call progression message overlaid the power-on page portion and the power-on page may or may not be present. If carrier has been previously detected (telephone answered), but no message was received from the host computer 14, the screen will have been restored to the initial power-on page display.

As shown in FIG. 7, the call/connection waiting page is displayed whenever carrier is detected following a dial completion. Note that if it is a manual dial process, the number above the word "WAITING" will have been cleared at the start of a manual dial process.

Note that a text for the call connection/waiting message overlays the power-on portion and the power-on page may or may not be present. If carrier has been previously detected (telephone answered) but no message was received from the host computer the screen will have been restored to the initial power-on page display.

V (b). Automatic re-dialing operation

Considering now the automatic re-dialing operation according to the present invention, assume that the terminal 20 is initiating a call to the host computer 14.

Assume further that the multiplex office 31 is located the closest geographic distance from the terminal 20, and that the multiplex office 28 is the next closest, with the office 26 being located geographically the furthest away from the terminal 20. Also, it will be assumed that all of the lines of the hunt groups for both of the office 28 and 31 are busy. Referring to FIGS. 1-3, after the power-on sequence is completed and the CALL key 132 is pressed, the microprocessor 81 responds to the signal generated by the CALL key by sending the telephone number of the multiplex office 31 previously stored in the non-volatile memory 114 during the initial call sequence, to the modem/dialer unit 70. The unit 70 then sends the telephone number (call origination information) of the multiplexing office 31 via the telephone line 62 to the central office 45. Upon doing so, the central office 45 returns a busy signal to the unit 70, which, in turn, sends a message indicative of the busy condition to the office 45 to the microprocessor 81.

The microprocessor 81 then causes the telephone number (call origination information) of the next closest multiplexing office 28 to be read from the non-volatile memory 114 and transferred to the unit 70 for transmission to the central office 45, according to a priority sequence established by the executive program stored in the memory 123.

The office 45 then returns a busy signal in accordance with the prior assumption. The unit 70 then returns a message indicative of the busy condition of the multiplex office 28 to the microprocessor 81. Under the control of the executive program stored in the memory 123, according to its priority sequence, the microprocessor 81 causes the telephone number (call processing information) of the multiplexing office 26 to be read from the non-volatile memory 114 and sent to the unit 70, which, in turn, transmits the call processing information to the central office 45.

The office 45 is then able to extend the communication path P through the office 45 and the central office 41, to the multiplexing office 26. From there, the path P is multiplexed to the host computer 14.

Thus, it should now be apparent to those skilled in the art that under the control of the logic means, including the microprocessor 81 and the executive program memory 114; a communication path is established from a calling terminal to the geographically closest multiplexing office having available lines. In this manner, the most economical, shortest available path, is established between any given calling terminal and the host computer 14.

It should also be understood that each telephone number being transmitted by the dialer/modem unit 70, is displayed to the user on the television receiver 83, so that the user can decide to disconnect a more expensive communication path, at any time, by merely pressing the HANG UP key 134. In this manner, the user can decide whether or not he or she would want to use the

V. (c) Telesoftware - multi-task processing

Referring now to FIGS. 1 and 2, telesoftware programs are downloaded from the host computer 14, via the communication path P, for storage in the telesoftware memory 121 in the terminal 20. The downloaded telesoftware is activated initially in a remote manner by the host computer, and is used to control the operation of the terminal, in connection with the multi-tasking executive program stored in the memory 123. During execution of the telesoftware program, the executive program monitors the communication path to determine whether data is being received from the host computer 14.

The executive program enables the telesoftware program to be executed in several different modes.

Firstly, in one mode, the telesoftware program is executed interactively with the host computer 14 via the communication path P. Secondly, the downloaded telesoftware program can be executed completely independently of the host computer 14. Thirdly, it can be executed substantially separately of the host computer, with the host computer interacting only periodically with the terminal.

When the telesoftware program is executed independently of the host computer, the communication path is disconnected to avoid having the subscriber incur unwanted charges for the use of the communication path. Thus, the multi-task capabilities allows economical and efficient use of the system 10. This is a particularly important advantage where the telesoftware program may require a substantial length of time to execute. For example, the telesoftware may be a video game, which may be played by the user for long periods of time.

In order to control the establishment or disconnection of the communication path, the telesoftware program includes information for that pucpose. In this regard, the telesoftware program includes communication path control information, which causes the modem/dialer unit 70 to control the communication path. For example, the control information can be utilized at the beginning of the telesoftware program execution, to cause a disconnect request message to be sent to the modem/dialer unit 70, under the control of the microprocessor 81, to instruct the unit 70 to disconnect the communication path (to hang up).

At a subsequent time during the execution of the program, in response to other communication path control information contained therein, an establishment request message is sent to the modem/dialer unit 70, under the control of the microprocessor 81, to instruct the unit 70 to re-establish another communication path to the host computer 14. Thus, in this manner, the terminal has programmed control over the establishment and disconnection of the communication path. In this regard, the path can be turned on and off selectively, to insure that the path is not maintained when it is not necessary for the host computer to communmicate with the terminal.

For a more complete description of the multi-tasking executive program, reference may be made to Section VI (a).

Telesoftware - multiple graphics control

The downloaded telesoftware program contains pictorial information to control the generation of the graphic presentation on the television receiver 83, under the control of the PLPS firmware stored in the memory 116. In this regard, the telesoftware contains graphic generating information used for controlling the bit plane configuration in the video memory 98, as determined by the PLPS firmware, for generating the graphic information, as described previously.

According to the present invention, the telesoftware can, if desired, include graphic generating information for direct screen access, without the use of the PLPS firmware. The telesoftware includes, where desired, direct screen access graphic generating information for controlling the bit plane configuration in the video memory 98 under the control of the microprocessor 81, independently of the PLPS firmware.

In this manner, higher speed animation techniques are employed, where such techniques are desirable. For example, video games frequently employ high speed graphic techniques.

Therefore, the telesoftware program includes PLPS graphics generating information causing the generation of a PLPS graphic display according to the NAPLPS information interchange standard, which provides for alpha-numeric and slower animation graphic techniques. Also, the telesoftware can include direct screen access graphic generation of graphics for the facilitating higher speed animation techniques. Moreover, a given telesoftware program can cause the generation of both types of graphic displays.

An example of the latter technique is where the PLPS presentation causes the display of a desired background pattern. The direct screen access presentation is then used to cause the generation of a relatively high-speed dynamic animated character, movably displayed relative to the PLPS generated background.

VI. TERMINAL FIRMWARE

Presentation videotex level features

Screen resolution is 256 horizontal pixels by 200 vertical pixels (PLPS display area). A status line positioned below the unit-coordinate display area is provided for keyboard echo when the terminal 20 has no unprotected fields and local echo is in effect. The host computer 14 is not allowed to write into or affect the Status Line. The color of the border surrounding the PLPS unit display area is black (blanked beam).

The terminal 20 employs a 16 by 9 bit color map for selection of 16 concurrent colors from a total of 512 possible colors. Blinking is performed by color map manipulation. Blink is implemented in color modes 1 and 2 only. The terminal 20 operates in a 7 or 8-bit NAPLPS environment. The host computer 14 initializes the terminal 20 for the 8-bit environment.

A memory pool of 4 K-bytes is available for allocation to the support of DRCS,-macro-PDIs, unprotected fields, and other memory intensive functions. The worst case DRCS storage requirements are computed by the following formula: w*h/8 bytes where w=width and h=height of the character cell size, and where h and w units are pixel counts for a screen resolution of 200×256.

A contiguous RAM area of 16 K-bytes are available for telesoftware usage (code and data).

NAPLPS Standard Conformance

The terminal 20 provides the level of funtionality defined by the "General Service Reference Model (SRM) for Videotex," Appendix B of an ANSI X3L2.1 document, entitled "Videotex/Teletext Presentation Level Protocol Syntax (North American PLPS)," published Draft Proposed American National Standard, Oct. 1, 1982. Both functionality and specific implementation parameters are defined in that appendix. On power-up, NAPLPS attributes default as specified in Table 30 of that same reference.

The terminal 20 accepts NAPLPS data encoding generated by conventional AT&T Frame Creation Terminal (FCT) (not shown). Any data base from a gateway system 10 is converted by the system 10 to conform to the foregoing standards.

Telesoftware Requirements

Downloaded software from the host computer 24 is supported in a manner as hereinbelow described. In this mode of operation, integrity of the terminal 20 can not be guaranteed, since the downloaded code can inadvertently destroy the PLPS RAM environment. According to the encoding scheme, the downloaded software is coded in absolute machine language, corresponding to the microprocessor 81 for the decoder 69. This software is transmitted from the host computer 14 in 8-bit binary format, to minimize transmission time. With reference to the callable firmware services, the downloaded code has the facility to read the keyboard 71, write to the television screen via the PLPS protocol, read or write the non-volatile memory 114, auto dial and disconnect, communicate with the host computer 14, and make use of a timing facility. Concerning hardware access, downloaded code has access to video memory, the color memory map, and the microprocessor bus extender. The bus extender provides the address, data, control, and status signals necessary to support external memory expansion (not shown), and/or a peripheral controller (not shown). No hardware write protect of the non-volatile memory 114 is implemented. ROM firmware called from telesoftware does not allow the terminal 20 ID field to be altered. If necessary, writing the terminal 20 ID (after the first time) is done via telesoftware, by accessing the non-volatile memory 114, without the assistance of firmware.

Operational Features

The following operational descriptions of the keyboard/display features are not addressed by the foregoing referenced NAPLPS document.

Pre-Connect Operation

After power up and prior to the call completion, the terminal 20 progresses through the following stages:
Power up check
Call setup
Call progression. Throughout the pre-connect phase (excluding the power-on check), all keyboard entry appears in the status line. Function key depressions are displayed as the ASCII code equivalents, e.g. LOCK="A".
Cursor positioning keys (e.g. HOME, ADVANCE, ARROW keys) cause responses as described in status line editing, as hereinafter described in greater detail.

Power Up Check

The terminal 20 automatically clears the screen, and then performs a short validation check, not to exceed four seconds in duration. A status message is displayed in the event of failure only. Refer to the operational messages description.

A status line (with local echo) is provided for the user (after the power-up check) to verify remote keyboard operation. Any key pressed during this stage is not transmitted to the network, but is displayed in the status line.

Call Set Up

A total of 512 bytes for screen display, keyboard processing, and program logic, are available for the Logo/Call Advice display (excluding the auto-dial logic). Depression of the CALL key 132 results in a display that prompts the user for auto dial or manual dial options. Depression of the CALL key is ignored during a call sequence in process, or if a host connection exists.

The selection of the manual dial option is determined by the presence of keyboard-entered numbers into the status line, otherwise the presorted auto dial sequence is initiated. The call is initiated at the depression of the ACTION key.

Auto Dial Operation

The depression of the CALL key 132 clears the status line, displays the call setup page, displays the first telephone number stored in the non-volatile memory 114, and displays "ACTION DIALS THE NUMBER" below the telephone number on the television receiver 83. Depression of the CALL key 132 is ignored during a call sequence in process, or if a host connection exists; and depressing the shift key and the CALL key 132 resets the terminal to the power up check and repeats the call set up sequence. The depression of the ACTION key 185 initiates the dial process.

Next, the call progression sequence, as hereinafter described, is performed. If the call connect or host connect (terminal does not receive a message from the host) fails, the next sequential telephone number stored in non-volatile memory 114 is accessed and the dialing process is repeated. If all access numbers have been exhausted, the treminal enters a quiescent state (the screen is blanked, and the power-on page is displayed).

The depression of the HANG UP key 134 terminates the current dialed number, and forces the access of the next telephone number. If there is no next number, the terminal enters a quiescent state (the screen is blanked and the power-on page is displayed).

Manual Dial Operation

The depression of the CALL key 132 clears the status line, displays the call setup page, displays the first telephone number stored in the non-volatile memory, and displays "ACTION DIALS THE NUMBER" below the telephone number. The depression of the CALL key is ignored during a call sequence in process, or if a host connection exists.

The number to be dialed is typed from the keyboard and displayed on the status line. The CANCEL key 178 can be used to erase these characters if auto dial is desired. Upon depression of the ACTION key 185, the keyboard-entered number is displayed below the word "DIALING" as the digits are dialed. Next, the call progression sequence, as hereinafter described, is performed. If the call connect or host connect (terminal does not receive a message from the host) fails, the terminal enters a quiescent state (the screen is blanked, and the power-on page is displayed). The depression of the HANG UP key terminates the dialing activity, and then the terminal enters a quiescent state (the screen is blanked and the power-on page is displayed). The "-" key is interpreted as a pause so that telephone switching access delays can be specified. The terminal does not validate keyboard characters, or the number of characters as the number is being dialed. Non-numeric characters (except -,*,#) are not dialed.

Call Progression

The depression of the ACTION key 185 initiates the dial process, displays the word "DIALING", overlaying "ACTION DIALS THE NUMBER" and displays the digits underneath the word "DIALING" as they are dialed. An approximate two second delay follows an off-hook condition (for assumed dial tone) for each telephone number attempted.

Following the dial process, the word "WAITING" overlays the word "DIALING". If, however, carrier is not detected within about 20 seconds, the terminal proceeds with the appropriate auto or manual dial process. If carrier is detected, the screen is blanked and the terminal is reset to SRM default attributes.

Each digit of the number is also displayed as it is dialed (nonvolatile memory code of "E" is displayed as "-"). Depression of the HANG UP key 134 aborts the current dialing sequence.

For pulse code dialing, the lowest standard speed option (10 pulses per second) is used to accomodate all local telephone company switch hardware.

Session Connect

Upon recognition of carrier tone, the terminal expects to receive a (any) message from the host prior to the terminal transmitting any message to the host. Otherwise, the terminal initiates a disconnect procedure following a delay of about ten seconds, and enters a quiescent state, whereby the screen is blanked and the power-on page is displayed.

Host-Interactive Operation

After successful dial operation, the host-to-terminal interaction depends on the presence or absence of unprotected fields and session echo-control commands. For a fully protected display image on the terminal (no unprotected fields defined), two types of keyboard character echos are possible:
Remote Echo (host-echoed), and
Local Echo (terminal echoed).
In both cases, characters are transmitted to the host computer 14, as the keys are pressed.

Remote Echo

An "echo" means that input characters are displayed by the terminal. The default state (immediately after successful connection to host) is one of remote echo. The keyboard characters are not displayed on the terminal until the host returns the character to the terminal. The host computer 14 has complete control of the display position (within the PLPS display area for these characters. Any characters typed after call connection are sent (without local echo) to the network.

Local Echo (Status Line)

When a fully protected display image (no PLPS unprotected fields) and a session "local echo" command are in effect, the keyboard characters are automatically echoed by the terminal on a status line, which is positioned below the PLPS display area. Each character is also transmitted to the host computer 14 at the time a key is pressed. Note that the host computer does not have write access to this display line.

Line Editing

The terminal (not the user) positions the cursor into the status line when the conditions specified in the preceding Local Echo section, are met. A limited editing capability is provided as follows:
 (1) RETURN key depression clears the status line and causes the cursor to move to column one of the status line.
 (2) When the 40th display is exceeded, the status line is cleared, and the cursor is moved to column one.
 (3) Activation key depressions cause the status line to be cleared. The next character is then placed in column one.
 (4) The ARROW cursor keys 187 (excluding up and down) are used for non-destructive left and right positioning. HOME key non-destructively position the cursor to column 1, and the ADVANCE key is ignored.

Status Line Attributes

The length of the displayable status line field is fixed at 40 characters. All attributes are fixed, i.e., not modifiable by the host computer 14 or telesoftware.

Alphanumeric characters are drawn using $6 \times 10$ dot matrix, nominal white outline with nominal black background, and normal intercharacter spacing. Whenever the 40th display position is exceeded, or when the RETURN key is pressed, the terminal transmits a return (1/13) and EOT (0/4) to the host computer 14. This enables the host computer to scroll the status line into the PLPS display area.

The EOT (end of text) character is transmitted following all activation characters.

Forms-Entry Operation

When one or more unprotected fields appear on the screen, the terminal reverts to a "forms entry mode", in which keyboard characters are echoed internally on an unprotected field, and buffered internally. Data entry and editing are performed via the terminal without host interaction.

Unprotected Field Editing

Cursor positioning for entry and editing within the unprotected fields shall be constrained as follows:
 (1) The cursor is not allowed to move into any protected region. Depression of the HOME key places the cursor in the upper left corner of the current field. The RETURN key causes the cursor to move to the leftmost position of the next line down (if possible), within the current field.
 (2) The cursor is movable within a field in all eight directions via the cursor-arrow keys. For a diagonal cursor key, movement continues until one of the four corners of the field is hit: i.e., a right diagonal cursor key causes cursor movement until the cursor is positioned in the upper right corner of the field.
 (3) The cursor remains at the boundary of a field, if an attempt is made to move the cursor beyond that field via the cursor-arrow keys. Audible feedback (error beep) is generated when keyboard action attempts to move the cursor across a boundary.

This includes the case of the cursor movement along a boundary when a diagonal arrow key follows the positive feedback that indicates correct keyboard character reception.

(4) Movement between the fields occurs in a sequential order, either one field forward or backward. The function key, ADVANCE, moves the cursor to the last vacated position of the next field. The shifted function key, ADVANCE, moves the cursor to the last vacated position of the previous field. Wraparound occurs between the top and bottom fields of the screen.

Unprotected field attributes

Upon definition of an unprotected field, the text size and color atributes are fixed. Additional attribute handling is described in Appendix B, "A General Service Reference Model (SRM) for Videotex," paragraph 11.1, of the foregoing referenced NAPLPS document.

Unprotected field transmission

As defined in the NAPLPS document, the contents of all unprotected fields are transmitted to the host computer 14 upon depression of a special key. For the terminal, this "send" key has been labelled ACTION.

Telesoftware operation

Downloaded software is responsible for reading and for interpreting data coming from the keyboard and communications line. Output from telesoftware may be directed to either the PLPS process or to the communication line. Output from PLPS can be directed to telesoftware (e.g., for possible encryption) or directed to the communication line. Refer to the routing diagram.

Telesoftware is downloaded and activated by session conmmands. Telesoftware can drive the display by passing PLPS data into the PLPS firmware or by storing directly into video memory and the color map memory. After a host disconnect function is requested by telesoftware, the terminal permits telesoftware to continue in operation.

Accessing of nonvolatile memory is accomplished via telesoftware only. Terminal firmware does not honor write requests from telesoftware that point to the terminal ID field. If this field must be changed, telesoftware performs the operation itself.

Add-on memory or controllers attached to the Bus Extender are accessed via standard 8088 memory-accessing instructions. Downloading into external add-on RAM memory (not shown) must be accomplished with a downloaded telesoftware task (resident in the internal RAM partition) that relays host data into external RAM memory.

Operational messages

After a successful power up check, the power-on page is displayed. If a failure is detected, a message is displayed (if possible) and the power-on page is not displayed.

Message text: "Terminal Test Failed, Call KEY-FAX" centered on the screen.

The call then progresses according to the foregoing description under the foregoing Call Progression section.

In a call waiting situation, a message is displayed upon loss of carrier for a period of time greater that 250 and less than 2250 milliseconds.

Message Text: Blinking "CALL WAITING" centered on 20th line.

Connectivity Controls

Nonvolatile memory (256 bytes) is available for the following items.
(1) Terminal identity comprised of manufacturer ID, Model number, and Serial Number. (Factory programmed - Write protected via terminal firmware, changeable if directly accessed by telesoftware).
(2) First Use telephone number (factory programmed-changeable by telesoftware),
(3) Log-on data stream (downloadable from Host) according to the host computer operating system log-on parameters.
(4) Service Usage attributes (downloadable from Host).
(5) The remainder of the storage area is available for a list of telephone numbers for auto dialer (including tone/pulse flag) (Downloadable from Host).

Keyboard Functions (Terminal Responses Only)

The appropriate terminal responses are summarized below. When telesoftware is executing, it must read and interpret all keys.

The command keys are summarized as follows:
(1) CALL - Prepares the terminal for manual or autodial sequence. Clears the Status Line and causes first access telephone number from nonvolatile memory to be displayed in PLPS area. The key is ignored if the terminal is not in a quiescent state.
(2) HANG UP - Cancels dial operation for the current telephone number during Pre-Connect Operation. Key code and EOT are transmitted to host followed by an on-hook condition without disturbing the in-process operations of the terminal.
(3) LOCK - Transmitted to the host only.
(4) SURPRISE - Transmitted to the host only.

The service keys are summarized, as follows:
(1) BANK - Transmitted to host only.
(2) SHOP - Transmitted to host only.
(3) RESERVE - Transmitted to host only.
(4) INFORM - Transmitted to host only.
(5) MAIL - Transmitted to host only.
(6) SPECIAL - Transmitted to host only.

The aid keys are summarized as follows:
(1) BROWSE - Transmitted to host only.
(2) MARK - Transmitted to host only.
(3) INDEX - Transmitted to host only.
(4) GUIDE - Transmitted to host only.
(5) HELP - Transmitted to host only.

The work keys are summarized as follows:
(1) SEEK - Transmitted to host only.
(2) NEXT - Transmitted to host only.
(3) BACK - Transmitted to host only.
(4) REPEAT - Transmitted to host only.
(5) CANCEL - Clears status line only in pre-connect operation, otherwise transmitted to host.

The special function keys are summarized as follows:
(1) ACTION For call sequence, this key initiates dial operation and does not transmit anything to the host computer. For forms entry, it initiates terminal-to-host transmission of unprotected fields. For other modes, the terminal treats it like any other activation key. The action character followed by the EOT character is transmitted to the host. Note that the ACTION/EOT sequence is appended to the end of the unprotected field message.

(2) RETURN This key causes the performance of a new line function in unprotected field or status line. The return character followed by the EOT character is transmitted to the host computer, if entered in the status line.

(3) HOME For forms entry or status line editing, this key controls cursor positioning.

(4) ADVANCE For forms entry, this key controls cursor positioning.

(5) The ARROWS For forms entry or status line editing, these keys control cursor positioning.

The ALPHA keys normal unshifted appearance are lower case. Shift plus a letter displays upper case. Shift also displays the top character on the punctuation key caps.

Concerning the numeric keys, unshifted is the normal position. A shifted number key (F1-F10) is an activation key, only if its associated NAPLPS macro, M0-M9, is undefined. If a macro is defined, the associated macro is invoked, i.e., F1=Macro 0 and F10=Macro 9.

Remote test

Remote testing is accomplished by a program, which is downloaded from the host computer using the telesoftware capability.

Communication protocol requirements

The following is a characterization of the protocol to be in communicating data between the host computer and the terminal.

Considering the Data Link Layer (Level 2), data is transmitted and received using the following asynchronous character formats:

| S8 MODE | S7 MODE |
| --- | --- |
| 1 start bit | 1 start bit |
| 8 data bits | 7 data bits |
| 1 stop bit | 8th bit = 0 (no parity) |
|  | 1 stop bit |

Note that eight bits are necessary to support pages created on an AT&T Frame Creation Terminal (FCT) and telesoftware.

Concerning Flow Control, single control codes (Xon/Xoff) are sent to the host computer to start or stop the flow of data from the host to the terminal. The terminal also responds to Xon/Xoff transmitted by the host computer.

Concerning binary transparency, a method of distinguishing random binary sequences from control codes, is provided. This feature allows transmission of binary data to and from the host computer and is especially useful for telesoftware downloading. Concerning Error Detection/Correction, host-to-terminal data integrity is accomplished at the link level and is enabled or disabled by the host computer via session command. Terminal-to-host data integrity is the responsibility of downloaded telesoftware. The process required to generate the 2-byte checksum, is described in a publication, entitled "An Arithmetic Checksum for Serial Transmission," by John G. Fletcher, published in IEEE Transactions on Communications, Volume Com-30, No. 1, January 1982.

Network layer (level 3) and Transport layer (level 4) session protocols need not be implemented. The session layer (Level 5) is hereinafter described in greater detail. The host computer 14 has control over the terminal processing via session layer commands, which are encoded as escape sequences.

Considering Presentation Entity Binding, initial communications between the host computer and the terminal occur at this level. The terminal responds to the host inquiry message with a response message that includes the terminal ID read from nonvolatile memory. Either 7 bit or 8 bit PLPS code set selection is also provided.

Concerning Input Monitoring, this layer monitors all communication inputs during either PLPS or telesoftware processing. This mechanism provides host control of the terminal.

Considering Error Detection/Correction Control, two session commands are provided to turn on and off the link layer data-integrity checking function.

In regard to the Local Echo Control, activation of the status line when the PLPS display area is entirely protected (Post-connect default) and is controlled by the host computer via session command.

Layered definition model

The ISO layered system architecture is a seven layered assembly of interrelated protocols required to define an entire communications system, in such a way that other protocols may be substituted at various layers in order to operate over different media.

The seven layers may be viewed in two major groupings. Levels 1 to 4 concern the transference of data while Levels 5 to 7 concern how the data is processed and used.

The Physical Layer (Level 1) provides mechanical, electrical and procedural functions in order to establsh, maintain and release physical connections.

The Data Link Layer (Level 2) provides a data transmission link across one or several physical connections. Error correction, sequencing, and flow control are performed in order to maintain integrity.

The Network Layer (Level 3) provides routing, switching and network access consideration in order to make invisible to the transport layer how underlying transmission resources are utilized.

The Transport Layer (Level 4) provides an end-to-end transparent virtual data circuit over one or several tandem network transmission facilities.

The Session Layer (level 5) provides the means to establish a session connection and to support the orderly exchange of data and other related control functions for a particular communication service.

The Presentation Layer (Level 6) provides the means to represent and interpret the information in a data coding format in a way that preserves it meaning. The detailed coding formats for the scheme described in the above references ANSI document, provide the basis of a Presentation Level Protocol for Videotex and related applications.

The Presentation Level Protocol encodes text and graphic information in such a way as to enable it to be easily communicated. Independence of display or communications hardware constraints is achieved by using NAPLPS as the basis of the coding scheme.

The Application Layer (Level 7) is the highest layer in the reference model and the protocols of this layer provide the actual service sought by the end user. As an example, the information retrieval service commands of a Videotex application form part of the application layer protocol.

Key Code Assignments (Decoder to Host Transmission)

The following is a list of the codes for the information generated by the actuation of the keys on the keyboard:

| Keycap Legend | Shifted Col. | Row | Non-Shifted Col. | Row | Comments |
|---|---|---|---|---|---|
| A | 4 | 1 | 6 | 1 | A,a |
| B | 4 | 2 | 6 | 2 | B,b |
| C | 4 | 3 | 6 | 3 | C,c |
| D | 4 | 4 | 6 | 4 | D,d |
| E | 4 | 5 | 6 | 5 | E,e |
| F | 4 | 6 | 6 | 6 | F,f |
| G | 4 | 7 | 6 | 7 | G,g |
| H | 4 | 8 | 6 | 8 | H,h |
| I | 4 | 9 | 6 | 9 | I,i |
| J | 4 | 10 | 6 | 10 | J,j |
| K | 4 | 11 | 6 | 11 | K,k |
| L | 4 | 12 | 6 | 12 | L,l |
| M | 4 | 13 | 6 | 13 | M,m |
| N | 4 | 14 | 6 | 14 | N,n |
| O | 4 | 15 | 6 | 15 | O,o |
| P | 5 | 0 | 7 | 0 | P,p |
| Q | 5 | 1 | 7 | 1 | Q,q |
| R | 5 | 2 | 7 | 2 | R,r |
| S | 5 | 3 | 7 | 3 | S,s |
| T | 5 | 4 | 7 | 4 | T,t |
| U | 5 | 5 | 7 | 5 | U,u |
| V | 5 | 6 | 7 | 6 | V,v |
| W | 5 | 7 | 7 | 7 | W,w |
| X | 5 | 8 | 7 | 8 | X,x |
| Y | 5 | 9 | 7 | 9 | Y,y |
| Z | 5 | 10 | 7 | 10 | Z,z |
| F1 1 | 3 | 1 | 3 | 1 | Activation when shifted (Note 2) |
| F2 2 | 3 | 2 | 3 | 2 | Activation when shifted (Note 2) |
| F3 3 | 3 | 3 | 3 | 3 | Activation when shifted (Note 2) |
| F4 4 | 3 | 4 | 3 | 4 | Activation when shifted (Note 2) |
| F5 5 | 3 | 5 | 3 | 5 | Activation when shifted (Note 2) |
| F6 6 | 3 | 6 | 3 | 6 | Activation when shifted (Note 2) |
| F7 7 | 3 | 7 | 3 | 7 | Activation when shifted (Note 2) |
| F8 8 | 3 | 8 | 3 | 8 | Activation when shifted (Note 2) |
| F9 9 | 3 | 9 | 3 | 9 | Activation when shifted (Note 2) |
| F10 0 | 3 | 0 | 3 | 0 | Activation when shifted (Note 2) |
| * | 2 | 10 | 2 | 10 | Activation when shifted (Note 2) |
| ÷ | 2 | 3 | 2 | 3 | Activation when shifted (Note 2) |
| ! ? | 2 | 1 | 3 | 15 | Activation when shifted (Note 2) |
| " ' | 2 | 2 | 2 | 7 | Activation when shifted (Note 2) |

When an activation key is pressed, the terminal sends the host an EOT (0/4) byte following the activation key code.

A shifted number key (1-9,0) is an activation key as indicated above, only if its associated macro, M0-M9, is undefined. If a macro is defined, the associated macro is invoked.

Keyboard-originated characters are transmitted to the host as a 7-bit code set. Activation codes are distinguished from alphabetic characters by their position as the last character prior to EOT message.

| Keycap Legend | Shifted Col. | Row | Non-Shifted Col. | Row | Comments |
|---|---|---|---|---|---|
| $ | 2 | 4 | 5 | 14 | |
| % / | 2 | 5 | 2 | 15 | |
| & + | 2 | 6 | 2 | 11 | |
| @ − | 4 | 0 | 2 | 13 | minus sign |
| ( = | 2 | 8 | 3 | 13 | |
| ) — | 2 | 9 | 5 | 15 | underscore |
| : ; | 3 | 10 | 3 | 11 | |
| . , | 3 | 12 | 1 | 12 | |
| , . | 3 | 14 | 2 | 14 | |
| Shift | | | | | not transmitted |
| Space | 2 | 0 | 2 | 0 | |
| Return | 0 | 13 | 0 | 13 | activation when in Status Line |
| Call | 5 | 9 | 5 | 7 | not transmitted |
| Hang Up | 5 | 10 | 7 | 10 | activation |
| Lock | 4 | 1 | 6 | 1 | activation |
| Surprise | 4 | 2 | 6 | 2 | activation |
| Bank | 4 | 3 | 6 | 3 | activation |
| Shop | 4 | 4 | 6 | 4 | activation |
| Reserve | 4 | 5 | 6 | 5 | activation |
| Inform | 4 | 6 | 6 | 6 | activation |
| Mail | 4 | 7 | 6 | 7 | activation |
| Special | 4 | 8 | 6 | 8 | activation |
| Browse | 4 | 9 | 6 | 9 | activation |
| Mark | 4 | 10 | 6 | 10 | activation |
| Seek | 4 | 11 | 6 | 11 | activation |
| Guide | 4 | 12 | 6 | 12 | activation |
| Help | 4 | 13 | 6 | 13 | activation |
| Action | 4 | 14 | 6 | 14 | activation |
| Next | 4 | 15 | 6 | 15 | activation |
| Back | 5 | 0 | 7 | 0 | activation |
| Repeat | 5 | 1 | 7 | 1 | activation |
| Cancel | 5 | 2 | 7 | 2 | activation |
| Index | 5 | 3 | 7 | 3 | activation |
| Left arrow | 0 | 8 | 0 | 8 | |
| Right arrow | 0 | 9 | 0 | 9 | |
| Down arrow | 0 | 10 | 0 | 10 | |
| Up arrow | 0 | 11 | 0 | 11 | |
| Rt. diag. up arrow | (shifted or not, sends 0/11 and 0/9) | | | | |
| Rt. diag. down arrow | (shifted or not, sends 0/11 and 0/9) | | | | |
| Lt. diag. down arrow | (shifted or not, sends 0/11 and 0/9) | | | | |
| Lt. diag up arrow | (shifted or not, sends 0/11 and 0/9) | | | | |
| Home | 1 | 14 | 1 | 14 | |
| Advance | 7 | 11 | 7 | 13 | next field (shifted=previous) |
| Clear | 1 | 2 | | | |

Non-Volatile Memory Map

Referring now to FIG. 8, there is shown the non-volatile memory map. The following information is applicable to:

N: One byte (at D'255, X'FF) giving the number of access #'s present in memory.

Access #'s: Each 12 bytes in length, encoded as 24 nybbles.
    0-9 digits to dial
    A *
    B #
    C pulse flag
    D tone flag
    E pause for 2.7 seconds (shown as "-" on screen)
    F filler (ignore and don't display)

Terminal ID (8 bytes, 16 nybbles)
    Manufacture ID: 2 nybble
    Model #: 4 nybbles
    Serial #: 8 nybbles
    Check Sum: 2 nybbles The terminal identification number, first access telephone number, and N=1 information are initially stored in memory, prior to the use of the terminal by a user.

Access telephone number bytes are read out from low to high address, and nybbles are processed, most significant first. In an autodial operation, telephone numbers are accessed in sequence and are read out from high to low address.

As shown in FIG. 9, an example of the first access telephone number, 312-490-3200, is shown as stored in the EEROM nonvolatile memory and tone dialing will be employed ("D"). As shown in FIG. 10, an example of the terminal indentification number field, 01 3000 00000002 XX where XX=checksum and 3000=Model 3, is shown as stored in the EEROM memory.

Link Layer Protocol

The link layer code coresides with the session layer code in less than 6K bytes in the memory of 125 (FIG. 2). The purpose of the link layer protocol is to provide for data transparency and link flow control.

All of the link layer commands are one byte sequences, as follows:

| Value | Mnemonic | Command |
|---|---|---|
| 1/1 | Xon | Transmit Enable |
| 1/3 | Xoff | Transmit Disable |
| 1/0 | DLE | Treat Next Byte as Data |
| 1/4 | DC4 | Clear Input |
| 0/4 | EOT | End of Link Layer Packet |

The following is a list of the link layer functions:
(1) Xon-Transmit Enable: After receiving an Xon command the transmit channel is enabled to send any data queued for transmission.
(2) Xoff-Transmit Disable: Upon receiving an Xoff, the transmitted channel becomes idle after the current character has completed transmission.
(3) DLE-Binary Transparency: To pass data to processes across a communications link where the data has a value between 0/0 and 1/15 inclusive, the transmitting link layer proceeds as follows:
  1. Precede the character with DLE (1/0).
  2. Add 2/0 to the character.
Thus, the data 1/11 is transmitted as 1/0,3/11. The receiving link layer is searching for a DLE character. Upon receiving the DLE character, the process proceeds as follows:
  1. Delete the DLE from the input stream.
  2. If the next character lies in the range 2/0 to 3/15, subtract 2/0, otherwise do nothing to it.
Thus, if a sequence 1/0, 3/11 is received, the link layer passes only 1/11 as data to the process.
(3) DC4-Clear Input Upon receiving a DC4 character, all input queues, which are active, are initialized to zero.
(4) EOT Character This character denotes the end of a link layer unit of data. The host computer receives this unit from a front end processor (FEP), which is not shown, in the host computer, when the FEP detects the EOT.

Session Layer Protocol

The session layer code coresides with the link layer code. The transmission considerations are as follows:

Back channel responses at 150 baud are to be minimized.
Minimal impact on PLP performance.
The data protection considerations are as follows:
Unspecified lengths of data may be protected.
Not all data needs protection.
Active processes in System to be controlled by the host computer as are follows:
1. PLPS
2. Telesoftware
3. Telesoftware Loader Session layer commands are invoked by the escape sequence ESC, 2/6, F, where F identifies the command. The value of F is 3/X, X=(0, ... 15) The commands are listed below.

| Value | Mnemonic | Parameters | Command |
|---|---|---|---|
| 3/0 | SEM | | Session Enquiry Message |
| 3/1 | SRM | (Term ID)-(Class) | Session Response Message |
| 3/2 | S7 | (Process Id) | Set 7 Bit State |
| 3/3 | S8 | (Process Id) | Set 8 Bit State |
| 3/6 | SFC | (Frame Id) | Start Frame Check |
| 3/7 | EFC | (Checksum) | End Frame Check |
| 3/14 | ACC | (Frame Id) | Accept Frame |
| 3/15 | REJ | (Frame Id) | Reject Frame |
| 3/9 | PLE | | Request Local Echo |
| 3/10 | RRE | | Request Remote Echo RRE |

Session commands, terminal to host, end with an EOT character.

The sequence of establishing a session is as follows:
(1) Terminal Call Sequence
  (1) Wait one "call waiting" period for the assumed telephone dial tone
  (2) Dial number
  (3) Establish modem interconnect
  (4) Send Xon to network
(2) Host Initiate Session
  (1) Send ESC, 2/6, SEM to terminal
  (2) Wait for terminal response described in 3.3
(3) Terminal Receives SEM Command
  (1) Send ESC, 2/6, SRM, (Terminal ID), (Class), EOT to host
  (2) Wait for next session command from host.

The terminal has the following process which may be activated from the host computer:
1. PLPS Decoder
2. Telesoftware
3. Telesoftware Loader Once a process has been activated by the host computer, it remains active until the host computer activates another process. In this way, the host computer communicates with only one process at a time.

It should be noted that loading the nonvolatile memory is performed via telesoftware through a firmware interface, so that another layer of security is achieved for the autodial numbers.

The host computer can activate any process by sending one of the following escape sequences.
ESC, 2/6,S7, (Process Id) or
ESC, 2/6,S8, (Process Id)
Where process ids are:
4/1=PLPS
5/3=Telesoftware (Execute)

These commands activate a seven bit process or an eight bit process respectively. The terminal intelligently switches between processes in response to host commands. The following four session commands are used to control Link Layer data integrity functions. The host defines the length of each frame to be checked. Use of these commands is hereinafter describes in connection with the telesoftware load sequence.

| Host: | |
|---|---|
| $3/6$ $byte0$ $byte1$ | Start Frame Check with Frame Id. (SCF) |
| $3/7$ $CS0$ $CS1$ | End Frame Check with Check sum. (EFC) |
| Terminal: | |
| $3/14$ $byte0$ $byte1$ $0/4$ | Accept Frame with Frame Id. (ACC) |
| $3/15$ $byte0$ $byte1$ $0/4$ | Reject Frame with Frame Id. (REJ) |

It should be noted that the terminal sets $byte0$ and $byte1$ are set to 13/14 and 10/13 respectively after transmitting an ACC, receiving a DC4 and during a power-on sequence. In hexidecimal this is $byte0$ $byte1$=DE AD.

According to the preferred method, the terminal maintains a check sum during the transmission of a data frame. The length of each data frame is unspecified and is determined by the sending process.

In order to initiate error checking, the host sends the session command (ESC, 2/6, SFC, $byte0$ $byte1$) followed by the data. The terminal detects this sequence, clears the sum register, and beings to accumulate the check sum with the first byte of data received.

The length of a data frame is not fixed and is determined by the sending process before transmission.

In order to terminate error checking, the sending process sends the escape sequence: ESC, 2/6, EFC, $CS0$ $CS1$. The terminal includes the escape sequence in its own check sum and compares that sum with the received check sum. If these values agree the terminal transmits a positive acknowledgement, if not, it transmits a negative acknowledgement.

It should be noted that the check sum is a two-byte integer.

Considering now the data frame acknowledgement, there is both a positive and negative acknowledgement. Considering the positive acknowledgement, if the check sum for a data frame is correct, the terminal sends the escape sequence: ESC, 2/6, ACC, $byte0$ $byte1$ $EOT$. This informs the host that the data frame associated with the telesoftware address was properly received.

Considering the negative acknowledgement, if a data frame check sum is incorrect, the terminal sends: ESC, 2/6, REJ, $byte0 $byte1$ $EOT$. The host must insure that all data frames are received correctly.

Considering now telesoftware downloading, the host transmits three session commands for telesoftware loading:
ESC, 2/6, S8, 5/1=Declare Telesoftware Address
5/2=Load Telesoftware
5/3=Telesoftware Execute

Telesoftware Load Sequence

The following sequence must facilitate the downloading of telesoftware in a continuous stream of output until all message blocks have been positively acknowledged by the terminal. This implies that the host computer does not have to wait for each block to be acknowledged before transmitting the next. A positive acknowledgement may not be received by the host computer 14, (lost message) or may be received with bad checksum (also treated as a lost message), in which case the message block will be re-sent by the host computer to the terminal.

The host computer 14 sends a Telesoftware Address (for subsequent load or start execution) via the following sequence:

| ESC 2/6 S8 $Process:=T.S. Address Input$ | |
|---|---|
| ESC 2/6 SFC $a$ $b$ | |
| $x$ $y$ $L1$ $L2$ | (Address-X(MSB) y(LSB) # of bytes = L1 L2) |
| ESC 2/6 EFC $C0$ $C1$ | |
| Terminal: ACK/REJ using $a$ $b$ | |

To transmit Telesoftware Data to the terminal, the following should be used:

ESC 2/6 $Process=T.S. Load$
ESC 2/6 SFC $c$ $d$
$Telesoftware data$
ESC 2/6 EFC $CO$ $C1$
Terminal: ACK/REJ using $c$ $d$ To transmit the Start Execution address $s$ $t$, the following should be used:

ESC 2/6 S8 $Process:=T.S. Address Input$
ESC 2/6 SFC $e$ $f$
$s$ $t$ $don't care$ $don't care$
Terminal: ACK/REJ with $e$ $f$ To initiate Telesoftware execution, the following should be employed:

ESC 2/6 S8 $Process:=T.S. execute$
Note (1) T.S. Address Input = 5/1
T.S. Load = 5/2
T.S. Execute = 5/3
(2) $$ are byte delimiters
(3) CO, Cl represent 16-bit checksum Two echo control commands are provided to control the display of keyboard characters when the entire display area is protected.
ESC, 2/6, RLE
ESC, 2/6, RRE Considering the remote echo (PLPS State), all keyboard characters are transmitted to the host computer at the time the keys are struck. The characters are not displayed until the host computer transmits the characters back to the terminal.

If the "local echo" (Non-PLPS State) session command is in effect, the terminal displays these characters in the status line as the keys are struck. These characters are transmitted by the terminal, character by character.

It should be noted that when one or more unprotected fields exist (forms entry mode) as controlled by the host computer, all keyboard characters are automatically displayed in the "current" unprotected field but not sent to the host computer. The user controls the "current" field by positioning the cursor to one of the unprotected fields. In this state, the Status Line is not used.

Telesoftware Interfaces

The following is a conceptual and functional perspective of the microprocessor and software environment of the terminal. The terminal is equipped to operate in two modes of operation, which are as follows:
  (1) Telesoftware driving the PLPS decoder with a PLPS data stream, and
  (2) Telesoftware driving the terminal hardware.

Assembly language calling sequences, including buffer areas, are defined for these modes. Memory addresses are provided for the following:
  (1) Entry points to PLPS decoder and hardware device drivers,
  (2) Video memory and color map, and
  (3) Telesoftware RAM space.

I/O calls from telesoftware to PLPS firmware are invoked from non-interrupt levels only. These calls pass single characters to and from process, using mailboxes supported by a hereinafter described mini-executive.

Concerning firmware calls, the firmware services (provided to downloaded telesoftware), which are outside the domain of the mini-executive, include:
  (1) Dial a Telephone number with status return.
  (2) Disconnect Comline
  (3) Exit to Cold Start. This causes the Pre-connect sequence (excluding Power-up checks) to be entered. The downloaded telesoftware is responsible for proper host computer interaction.

It should be noted that the "Exit to PLPS" function is not controlled by the terminal. The host computer must issue a session command to activate the normal PLPS process. Considering now the hardware access functions, examples of telesoftware access-to-hardware functions are as follows:
  (1) Write to Microprocessor-Bus-Extender,
  (2) Read from Microprocessor-Bus-Extender,
  (3) Write Pixel to Video Memory, and
  (4) Write Color Value to Color Map.

The executive software is a small scale multitasking executive designed specifically and minimally to support telesoftware applications. The executive comprises the following components:
  (1) scheduler (tasks)
  (2) intertask communication handler (mailboxes)
  (3) I/O system and interrupt handlers (devices).

The executive calls available to tasks are hereinafter described. The task structure of the executive software comprises the following components:
  (1) session-in
  (2) session-out
  (3) keyboard-in
  (4) initialization (INIT)
  (5) telesoftware (TS, TS2, TS3, TS4)
  (6) plps decoder (PLPS)
  (7) telesoftware load (TS-Load).

At any given moment in time, only one of these tasks is running. The executive may choose a new task any time the running task makes a system call. The choice is made by priority, according to the foregoing list.

Considering now the session-in software, the session-in task is responsible for taking input information from the communications line and sending it to the appropriate recipient. Usually the recipient is PLPS. During telesoftware loading, the recipient is TS-Load. A running TS can make itself the recipient. Session-in software also handles the session-level protocol, which controls switching between PLPS, TS-Load, and TS. Session-in software makes procedure calls to a link-layer procedure to obtain a byte from a comm-line queue, then sends it via mailbox to the recipient. Initially, session-in is active.

Considering now the session-out software, the session-out task receives bytes from whatever source and passes them to a link-layer procedure, which queues them for transmission out onto the communications line. This link-layer procedure may also be called directly from session-in for purposes of sending and XON or XOFF. For instance, the input interrupt handler calls a special procedure which sets things up to force an XOFF/XON to go out on the communications line at the next available opportunity. Initially, session-out is active.

Considering now the keyboard-in task, the keyboard-in task is responsible for extracting bytes from the keyboard input queue and sending them by mailbox to receiver. Normally, the receiver is PLPS. An active TS can make itself the recipient instead.

The INIT task is entered after power-up or started whenever the software decides to restore the system to a known initialized state. It does a complete initialization of the entire system, including display and handling of power-up pages. Initially, INIT is active and eligible for scheduling. When it is done, it disables itself using the MC_STOP call.

The TS task runs applications programs which have been loaded from the host computer. Initially, it is dormant and cannot be scheduled. It is always stopped automatically, whenever the system receives a session level load telesoftware command.

Considering now the TS2, TS3 and TS4 tasking, these tasks can be used for telesoftware applications, which are most conveniently handled using multi-tasking. Initially, they are dormant, they can be activated by using the MC_SETPC, and the by MC_START. They are stopped by using MC_STOP. Then the system terminates automatically whenever it receives a session-level load telesoftware command.

Considering the PLPS decoder, the PLPS decoder communicates with the communication line and keyboard. It writes to the display. Initially, PLPS is active and is eligible for scheduling.

The TS-Load task is responsible for loading in new code for the TS task from the communications line, according to a specially defined protocol. This task is normally started and stopped by the session-in task. Initially, TS-Load is dormant.

Considering now the mailboxes, tasks communicate with one another using the mailboxes. The following mailboxes are statically assigned. Each is associated with one task which is the only reader of (or receiver from) the mailbox.
  (1) TS-from-PLP
     Read by TS to intercept PLP bytes sent to the comm-line.
  (2) TS2-IN
  (3) TS3-IN
  (4) TS4-IN
     These are extra mailboxes intended for use by the TS application. If a TS application consists of several tasks, then these mailboxes can be used for intertask communication.
  (5) TS-SER-IN Read by TS to retrieve bytes from the comm-line (mainly to intercept bytes sent to the PLP).

(6) TS-KBD-IN

Read by TS to retrieve bytes from the keyboard input (and intercept keyboard input going to the PLP).

(7) PLP-SER-IN

PLP reads this mailbox to obtain bytes in the NAPLPS protocol.

(8) PLP-KBD-IN

PLP reads this mailbox to get bytes from the keyboard input.

(9) SESSION-OUT

Session-out reads this mailbox to obtain bytes to be sent out onto the communications line.

(10) TS-LDR

TS-Load reads this mailbox to obtain bytes for loading in a new TS task.

To support the requirement that TS be able to intercept any byte going to or from the communications line or keyboard, three extra mailboxes are provided which can be dynamically redirected to establish the connections desired. If a byte is sent to one of the following three special mailboxes, then the byte is actually placed in one of the above-described mailboxes.

Considering the PLP-OUT-BYTE, by convention, PLPS always sends its output to PLP-OUT-BYTE. Initially, PLP-OUT-BYTE refers to SESSION-OUT, so that bytes are sent out on the comm-line. Alternatively, if TS wants to post process PLP output, it can switch PLP-OUT-BYTE to send to TS-FROM-PLP (it would then be the responsibility of TS to send any PLP output to SESSION-OUT).

Considering SESSION-IN-BYTE, by convention, session-in always sends to SESSION-IN-BYTE. Initially, SESSION-IN-BYTE refers to PLP-SER-IN, so bytes get passed from the comm-line to PLP. Alternatively, if session-in wants to initiate telesoftware loading, it can switch SESSION-IN-BYTE to send to TS-LDR. Or, if TS wants to preprocess PLP input, it can switch SESSION-IN-BYTE to send to TS-SER-IN (it would then be the responsibility of TS to send any PLP input to PLP-SER-IN).

Considering KBD-IN, by convention, keyboard-in always sends to KBD-IN. Initially KBD-IN refers to PLP-KBD-IN, so that bytes get passed from the keyboard to the PLP. If TS wants to redirect or preprocess keyboard input, it may switch KBD-IN to refer to TS-KBD-IN instead (it would again be the responsibility to send any keyboard input intended for PLP to PLP-KBD-IN). All mailboxes reside in the system address space and should be referred to in system calls via predefined constant values.

Considering system calls, the executive system provides a limited number of system calls. Only these calls which cause the caller to block, (MC_WTRECV, MC_TSEND, MC_WTIO, and MC WAIT), force rescheduling, which means that the caller may be suspended while another task is placed into execution. System calls are shown below as they should be called from Pascal programs. The actual calls use the instruction, INT n, where "n" is the number of the system call. Inter-segment calls can be supported from external memory (not shown) attached to the Bus Extender.

Considering (mc_send (mbox, word: INTEGER, VAR status: INTEGER), this attempts to place the word "word" into the mailbox "mbox". "Status" is non-zero if the attempt failed. Failure occurs if the mailbox is already full. It is up to the caller to retry until successful, preferably relinquishing the processor via MC_WTSEND if there is nothing else to do.

Considering mc_wtsend (bits: INTEGER; VAR status: INTEGER), this suspends the calling process until a message is sent to any of several mailboxes, each of which is represented by having a particular bit turned on in "bits". The system returns an error status if there are any bits turned on which are not defined for mailboxes.

Considering mc_recv (Mbox: INTEGER; VAR word, status: INTEGER), this attempts to receive a word from a mailbox. The system returns an error status if there is nothing to receive or if there is no such mailbox. MC-WTRECV is used if your task is to block until there is something to receive.

Considering mc_wtrecv (bits: INTEGER; VAR status: INTEGER), this suspends the calling process until it is possible to receive a message from any one of several mailboxes. Each bit of "bits" represents a particular mailbox. The system returns an error status if there is any bit turned on which represents a non-existant mailbox.

Considering mc_switch (special_mbox, mbox: INTEGER; VAR status: INTEGER), this call is used to redirect one of the three special mailboxes described above to a different destination. An error status is returned if either "special mbox" or "mbox" are out of range.

Considering mc_stop (task-id: INTEGER; VAR status: INTEGER), this makes the task number "task_id" dormant and ineligible for execution. This is mainly intended to allow session-in to deactivate the current TS task or TS-Load task when necessary. An error status is returned if "task_id" is out of range.

Considering mc_start (task_id: INTEGER; VAR status: INTEGER), this makes the task number "task_id" active at its initial starting address. The initial starting address is set when the system comes up and cannot be changed thereafter. An error status is returned if "task_id" is out of range.

Considering mc_setpc (task_id: INTEGER; VAR status: INTEGER), this sets the new execution address of the task "task id" to be the argument, "pc".

Considering now mc_ee_rd (addr: INTEGER; VAR word, status: INTEGER), the system reads eight bits of data from address "addr" of the EE-PROM non-volatile memory and places it in "word". The system returns an error status if the EE_PROM non-volatile memory is busy, in which case MC_WTIO (EE_PROM ) should be called.

Considering mc_ee_wr (addr, word: INTEGER; VAR status: INTEGER), the system writes the lower eight bits of data in "word" to address "addr" of the EE-PROM non-volatile memory. An error status results if the EE-PROM memory if busy, in which case MCWTIO (EE_PROM) should be called.

Considering mc_wtio (device: INTEGER; VAR status: INTEGER), this call is intended to allow a task to block until such time as a device interrupts. This is mainly intended for the device handler processes. For instance, when an input handler has exhausted the contents of its queue, it should wait for an interrupt before checking again, rather than looping forever waiting. Also, TS applications writers will want to use this call to wait for the EE-PROM memory if it is busy.

The system includes the following devices:

(1) COMM-LINE-IN

The Session-in task controls this device, which is the communications line input.

(2) COM-LINE-OUT

The Session-out task controls this device, which is the communications line output.

(3) KEYBOARD

The Keyboard-in task controls this device, which is the keyboard input. The device handler translates the row-column matrix addresses returned by the keyboard controller into the desired binary character representation.

(4) EE-PROM NON-VOLATILE MEMORY

An MC_EE_RD or MC_EE_WR system call can be used by anyone to read bytes from or write bytes to this device, which is the non-volatile memory.

The executive system provides for interrupt handling and takes care of any buffering of received characters.

VII. EXECUTIVE SYSTEM OVERVIEW

The multi-tasking executive program stored in the read only memory 123 (FIG. 2), consists of a task handler, a set of interrupt handlers, a set of systems service routines, and a set of predefined tasks.

A task is a sequential piece of coding which performs some clearly defined function. To the software of the system 10, a task is simply a collection of registers which must be saved and restored at certain times.

A task can make calls on system service routines using software interrupts. The service routines provide a variety of functions, including the ability to start or stop a task, to obtain the current timer value, to read or write the EEPROM non-volatile memory 114, and to cause the dialing of a telephone number (call origination number). The most important feature of the service routines is that they provide a means for tasks to communicate with one another.

A task can communicate with another by sending a message to a mailbox, from which the other task is expecting to receive messages. System calls allow the transfer of 16-bit words one at a time, from the sender to the mailbox, or to the receiver from the mailbox. A message can be only one word, or a group of words. In some cases, such as the data sent to the NAPLPS Decoder Task, messages are treated as a part of a continuous stream of data. A mailbox is a First-In-First-Out queue (FIFO) which can contain up to 50 words. One reason for using a FIFO is to permit a task to send a multi-word message without having to give up the microprocessor 81, ensuring that no other task can send a message until transmission of the current one is complete. Although the system supports having multiple readers of a mailbox, it is best to have only one reader per mailbox. Certain mailboxes are "switchable", which means that messages sent to them are redirected to a destination mailbox which can be switched during task execution.

The task handler is invoked from the system service routines whenever a task relinquishes the microprocessor in order to find a new task to execute. It is important to note that a task must give up the microprocessor 81 voluntarily - it cannot be preemptively suspended. Of course, interrupts are liable to occur during task execution, but they are not allowed to change the state of the running task.

The advantage of this scheme is that a program sharing data with another task, does not have to be concerned about the possibility that its task will be suspended in the middle of updating shared data or sending a multi-word message (critical sections). Because the program determines when it gives up the microprocessor 81, it can ensure that it only gives up control when it is safe to do so.

Figure 11:
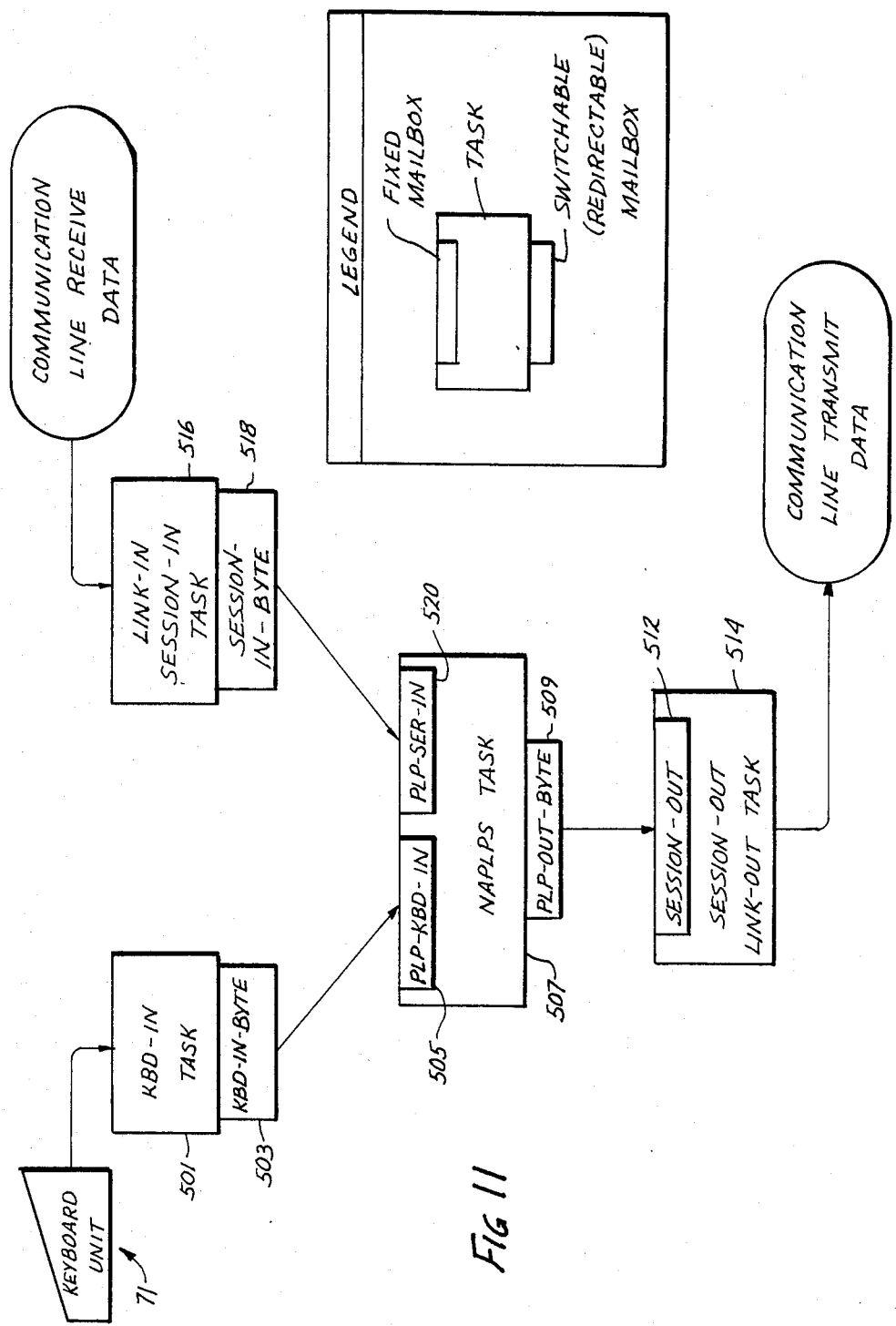
FIGS. 11 and 12 are flow chart diagrams of the terminal executive program.

Referring now to FIG. 11, there is shown a typical representative example of a task/mailbox configuration of PLPS grahic generation, without the use of a telesoftware program. The narrow rectangular boxes indicate mailboxes. The ones shown outside the task boxes are redirectable or switchable mailboxes.

The keyboard unit 71 has its output handled by a keyboard-in task, as indicated at 501, via a switchable kbd-in-byte mailbox 503. From there, the data flow is to a fixed PLP-kbd-in mailbox 505 for a NAPLPS task 507. A switchable PLP-out-byte mailbox 509 is in the data flow path to a fixed Session-out mailbox 512 for a Session-out task 514 for preparing the data to be transmitted over the communication line.

Additionally, incoming data received from the communication line is handled by a link-in session-in task 516, which has a switchable mailbox 518. A fixed PLP-Ser-in mailbox 520 receives data therefrom for the NAPLPS task 509. The remainder of the information flow is the same as the flow for the keyboard data entry.

Figure 12:
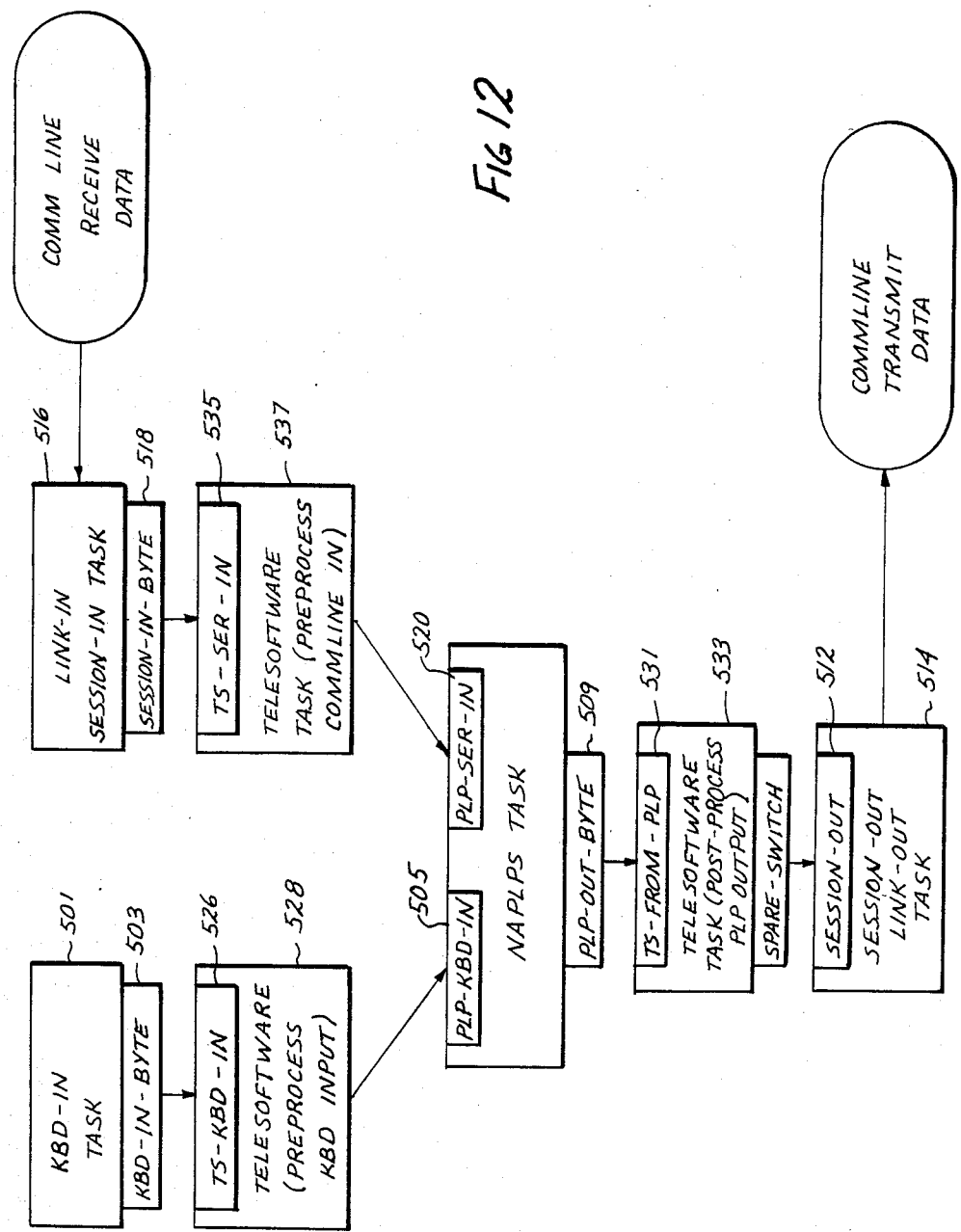

Referring now to FIG. 12, there is shown a flow chart diagram illustrating a task/mailbox configuration for a telesoftware tasks utilizing NAPLPS graphics.

The keyboard-in task 501 mailbox 503 having the switchable Kbd-in handles keyboard data entry for passing it to a fixed TS-Kbd-in fixed mailbox 526 of a telesoftware task 528, which preprocesses the keyboard input data.

From there, the flow continues to the fixed PLP-Kbd-in mailbox 505 of the NAPLPS task 507. The flow continues from the switchable PLP_out_Byte mailbox 509 to a fixed TS-from-PLP mailbox 531 of a telesoftware task 533 to post-process the PLPS output data and supply it to the fixed Session-out mailbox 512 of the Session-out link-out task 514 for the communication line.

For incoming communication line data, a fixed TS-Ser-in mailbox 535 for a telesoftware task 537 preprocesses data via the link-in session-in task 516. From there, the NAPLPS task 520 processes the information and the flow continues to the communication line as described previously.

It should be understood, that when the terminal processes a telesoftware program, with direct screen access, the NAPLPS task 520 is not needed, and the executive program is not involved. The microprocessor 81 executes the telesoftware program independently of the executive program.

For each device which can interrupt the microprocessor 81, there is an interrupt handler. If the device receives data, then the interrupt handler accepts the data and places it in a FIFO queue, which is read by the task (supplied as part of the system) which, in turn, handles input from that device. If the device transmits data, then the interrupt handler removes data from an output FIFO queue, which is filled by the task handling the output to that device.

In the following description, numbers are represented as either decimal or hexadecimal. A hexidecimal number differs from a decimal number in that the hexidecimal number is immediately followed by the letter "H" and may contain the hexadecimal digits "A" through "F". For instance, the "10" is decimal, while "23H" and "1FF" are hexidecimal.

Considering now the task structure, the tasks controlled by the system are shown in the following list, along with their task numbers.

| | |
|---|---|
| session-in | 0 |
| session-out | 1 |
| keyboard-in | 2 |
| INIT | 3 |
| TS | 4 |
| TS2 | 5 |
| TS3 | 6 |
| TS4 | 7 |
| PLPS | 8 |

A task may be in any one of the following states:

Running: The task is the one currently running in the system. (At any given moment in time, only one task can be running in the system).

Ready: The task is eligible to be selected as the next running task.

Blocked: The task is not eligible to be scheduled because it is waiting for some event to occur. It can be waiting for another task to receive a message, for another task to send a message, or for an i/o interrupt to occur.

Dormant: The task is not eligible to be scheduled because it has not been started. A task is started by using the MC_START system call.

The task handler is invoked to choose to new task whenever the running task blocks itself. The choice of a new task is made by priority, with the lowest numbered task having the highest priority.

The session-in task is responsible for taking input from the communications line and sending it to the appropriate recipient. Usually the recipient is PLPS. Because session-in always sends the data it receives to the switchable SESSION-IN-BYTE mailbox, a TS task can make itself the recipient, typically by switching SESSION-IN-BYTE to refer to TS-SER-IN.

Session-in also handles the session-level protocol which includes telesoftware loading. Session-in makes procedure calls on a link-layer procedure to obtain a byte from a comm-line (communication line) queue, then sends it via mailbox to the recipient. Each message it sends contains one byte on the lower half of the word. Any session level command sequences are stripped out and acted upon by session-in - they are not passed on any further.

Initially, session-in is ready to run. When it has nothing to do, it blocks waiting for an input interrupt from the communications line.

The session-out task receives bytes from whatever source and passes them to a link-layer procedure, which queues them for transmission out onto the communications line. It obtains bytes to transmit by receiving them from the session-out mailbox.

Several different message formats are accepted. To send out an arbitrary character, with no special processing, send a message with a zero in the upper half of the word and the character in the lower half.

To send out a control character in "binary transparency" mode, a ASCII DLE (010H) is placed in the upper half of the word and the desired control character is placed in the lower half thereof. Session-out sends out a DLE followed by the control character with 020H added to it. However, if the character in the bottom half of the word is not a control character, then session-in sends the character as is and not preceded by a DLE.

To send out an action key code followed by EOT (end of text), ASCII EOT (04H) is placed in the upper half of the word with the key code in the lower half. Session-out transmits the lower half word (as is) followed by the upper half word. In actual fact, the upper half does not have to contain EOT: it can be anything but zero or DLE.

Initially, session-out is ready to run. When it has nothing to do, it blocks waiting for a message to be sent to the session-out mailbox.

The keyboard-in task is responsible for extracting bytes from the keyboard input queue and sending them by mailbox to a receiver. Normally, the receiver is PLPS. Because the keyboard-in task always sends bytes to the switchable KBD-IN mailbox, a TS task can make itself the recipient instead, by switching the mailbox to refer to TS-KBD-IN.

The messages sent by keyboard-in contain a character in the lower half word and a code indicating the type of character in the upper half word. The codes used are as follows:

| | |
|---|---|
| 00H | Any ASCII character |
| 01H | Cancel key |
| 02H | Action or Call key |
| 04H | Other Activation key (EOT) |
| 08H | Cursor key |
| 10H | Function key |

Initially, keyboard-in is ready to run. When there is nothing for it to do, it blocks waiting for an input interrupt from the keyboard.

The INIT task is entered as part of a sequence which is initiated when the system branches through the power up reset vector. It does complete initialization of the entire system, including display and handling of power-up pages. Initially INIT is ready to run. When it is done, it disables itself using the MC_STOP call.

The TS task runs applications programs which have been loaded from the host computer 14. Initially, it is dormant and cannot be scheduled. It is always automatically stopped whenever the system receives a session level load telesoftware command.

The TS2/TS3/TS4 tasks are used for telesoftware applications which are most conveniently handled using multi-tasking. Initially, they are dormant. They are activated by using MS_SETPC, then MC_START. They are stopped by using MC_STOP. The system terminates them automatically whenever it receives a session-level load telesoftware command.

The PLPS decoder communicates with the communication line and keyboard unit 71. It writes to the display memory for the visible screen. Initially, PLPS is ready to run.

The PLPS task looks for keyboard data in the PLP-KBD-IN mailbox and for incoming data from the communications line in the PLP-SER-In mailbox. It sends data out on the communications line by placing bytes into the switchable PLP-OUT-BYTE mailbox.

Considering now the mailboxes, tasks communicate with one another using mailboxes. Mailboxes are statically assigned. Each is normally expected to be associated wth one task which is the only reader of (or receiver from) the mailbox. Note that the executive program does not have the ability to verify that this is the case.

In system calls, mailboxes are referred to by using two different numbers. In most system calls involving mailboxes, a mailbox is referred to by its number. However, the MC_WTRECV and MC_WTSEND calls allow the waiting for more than one mailbox. The following is a list of the mailbox names and their associated (hexadecimal)numbers.

| SPARE-SWITCH | 0 | 0001H |
|---|---|---|
| SESSION-IN-BYTE | 1 | 0002H |
| PLP-OUT-BYTE | 2 | 0004H |
| KBD-IN | 3 | 0008H |
| PLP-SER-IN | 4 | 0010H |
| SESSION-OUT | 5 | 0020H |
| PLP-KBD-IN | 6 | 0040H |
| TS-SER-IN | 7 | 0800H |
| TS-KBD-IN | 8 | 0100H |
| TS-FROM-PLP | 9 | 0200H |
| SPARE1 | A | 0400H |
| SPARE2 | B | 0800H |
| SPARE3 | C | 1000H |
| SPARE4 | D | 2000H |
| SPARE5 | E | 4000H |
| SPARE6 | F | 8000H |

The following is a description of the function of each mailbox:

| | |
|---|---|
| TS-FROM-PLP | Read by TS to intercept PLPS bytes sent to the comm-line |
| SPARE1 SPARE2 SPARE3 SPARE4 SPARE5 SPARE6 | These are extra mailboxes intended for use by the TS application. If a TS application is partitioned into several tasks, then these mailboxes can be used for inter-task communication. |
| TS-SER-IN | Read by TS to read bytes from the comm-line (mainly to intercept bytes sent to the PLP). |
| TS-KBD-IN | Read by TS to read bytes from the keyboard input (and intercept keyboard input going to the PLP). |
| PLP-SER-IN | PLPS read this mailbox to obtain bytes in the NAPLPS protocol. |
| PLP-KBD-IN | PLPS reads this mailbox to get bytes from the keyboard input. |
| SESSION-OUT | Session-out reads this mailbox to obtain bytes to send out onto the communications line. |

To support the requirement that TS be able to intercept any byte going to or from the communications line or keyboard unit 71, three extra mailboxes, which can be dynamically redirected to establish the connections desired, are designated. If a byte is sent to one of the following three special mailboxes, then the byte is actually placed in one of the mailboxes described above.

| | |
|---|---|
| PLP-OUT-BYTE | By convention, PLPS always sends its output to PLP-OUT-BYTE. Initially, PLP-OUT-BYTE refers to session-out, so bytes get sent out on the comm-line. Alternatively, if TS wants to postprocess PLPS output, it can switch PLP-OUT-BYTE to send to TS-FROM-PLP (it would then be TS' responsibility to send any PLPS output to session-out). |
| SESSION-IN-BYTE | By convention, session-in always sends to SESSION-IN-BYTE. Initially, SESSION-IN-BYTE refers to PLP-SER-In, so bytes get passed from the comm-line to PLP. |

*-continued*

| | |
|---|---|
| | Alternatively, if session-in wants to initiate telesoftware loading, it can switch SESSION-IN-BYTE to send to TS-LDR. Or, if TS wants to preprocess PLPS input, it can switch SESSION-IN-BYTE to send to TS-SER-IN (it would then be the responsibility of TS to send any PLPS input to PLP-SER-IN). |
| KBD-IN | By convention, keyboard-in always sends to KBD-IN. Initially, KBD-IN refers to PLP-KBD-IN, so bytes get passed from the keyboard unit 71 to the PLP. If TS wants to redirect or preprocess keyboard input, it may switch KBD-IN to refer to TS-KBD-IN instead (it would again be the responsibility of TS to send any keyboard input intended for PLPS to PLP-KBD-IN). |
| SWITCH-SPARE | This is a spare switchable mailbox which can be used by a TS application, if desired. |

All mailboxes reside in the system address space and should be referred to in system calls via the predefined constant values.

Considering now the mailbox/task relationships, although mailboxes and tasks are completely independent in theory, they are quite closely connected in practice. FIG. illustrates a standard set of interconnections which the system is intended to support.

It is important to note that the switchable mailboxes are arranged so that all the inputs to, and the outputs from the PLPS task, can be intercepted, if desired.

The system includes the following devices:

| | |
|---|---|
| COMM-LINE | 001H The session-in task controls this device, which is the communications line input. |
| COMM-LINE-OUT | 002H The session-out task controls this device, which is the communications line output. |
| KEYBOARD | 004H The Keyboard-in task controls this device, which is the keyboard input. The device handler translates the row-column matrix addresses returned by the keyboard controller into the desired binary character representation. |
| EEROM | 008H An MC_EE_RD or MC_EE_WR system call can be used by any source to read bytes from or write bytes to this device, which is the non-volatile memory 114. |

The executive system provides for interrupt handling and takes care of any buffering of received characters.

Considering the definition of the executive calls, executive calls are made using software interrupts. To call the executive, a task first loads the appropriate registers, and then issues the proper software interrupt, INIT (n). In the following section, each call is defined for the interrupt number, the input registers, the output registers, and the associated error codes.

Note that software interrupt numbers 02FG through 032H are reserved for use as a special interface for the NAPLPS decoder task.

A call MC_SEND indicates send a message to a mailbox, as follows:

```
Software interrupt number: 020H
Input registers: AX, BX
    AX (- 16 bit integer (contents for mailbox))
    BX (- 16 bit integer (mailbox number))
Output registers: DH, DL
    DH (- 8 bit boolean (status flag))
        0 = fail
        1 = successful
    DL (- 8 bit integer (error number))
        0 = NO_ERROR
        1 = ERR_B_RANGE
        2 = ERR_BOX_FULL
```

Other registers are unaltered.

This call attempts to place a one word message in the specified mailbox. If the mailbox number is one of the three indirection mailboxes, then the mail is indirected accordingly. If ERR_BOX_FULL status is returned, then the processor unit 81 should be relinquished by doing an MC_WTSEND, and the an ERR_BOX_FULL status must be expected, in case some higher priority task has sent a message to the mailbox between the time the task in question was made ready and the time it started running.

A call MC-WTSEND indicates wait until a send is possible, as follows:

```
Software interrupt number: 021H
Input register: BX
    BX (- 16 bit map; each bit designates a mailbox bit
         i set =) wait for mailbox "i"
Output registers: DH, DL
    DH (- 8 bit boolean (status flag))
        1 = successful
    DL (- 8 bit integer (error number))
        0 = NO_ERROR
```

Other registers are unaltered.

This call suspends the calling task until it is possible to send more mail to at least one of the indicated mailbox(es). The mailboxes to be waited on are specified using a one word bit vector. Each bit in the word corresponds to one of the maiboxes. The exact bit assignments have been indicated in the description of the mailboxes.

A call mc_recv indicates receive a message from a mailbox, as follows:

```
Software interrupt number: 022H
Input registers: BX
    BX (- 16 bit integer (mailbox number))
Output registers: AX, DH, DL
    AX (- 16 bit integer (mailbox contents))
    DH (- 8 bit boolean (status flag))
        0 = fail
        1 = successful
    DL (- 8 bit integer (error number))
        0 = NO_ERROR
        1 = ERR_B_RANGE
        2 = ERR_BOX_FULL
```

Other registers are unaltered.

This system call takes a one word message from the given mailbox. If ERR_BOX_EMPTY status is returned, then MC_WTRECV should be undertaken and the operation repeated. Note that, even after an MC_WTRECV, an ERR_BOX_EMPTY status must be expected.

A call MC_WTRECV indicates wait until a message is received, as follows:

```
Software interrupt number: 023H
Input registers: BX
    BX (- 16 bit bit map (mailbox numbers))
Output registers: AX, DH, DL
    DH (- 8 bit boolean (status flag))
        1 = successful
    DL (- 8 bit integer (error number))
        0 = NO_ERROR
```

Other registers are unaltered.

This routine suspends a running task until at least one of the specified mailboxes contains mail. It is normally used by a task which has received an ERR_BOX_EMPTY status from MC_RECV. Such a task then may choose to wait for mail from one or more mailboxes. The desired mailboxes are indicated by turning on bits in one word bit vectors. The calling task is suspended until there is mail in at least one mailbox.

A call MC_SWITCH indicates redirect a redirectable mailbox, as follows:

```
Software interrupt number: 024H
Input registers: AX, BX
    AX (- 16 bit integer (destination mailbox number)
    BX (- 16 bit integer (mailbox number to be redirected))
Output registers: DH, DL
    DH (- 8 bit boolean (status flag))
        0 = fail
        1 = successful
    DL (-8 bit integer (error number))
        0 = NO_ERROR
        1 = ERR_B_RANGE
```

Other registers are unaltered.

There are four redirectable mailboxes: SESSION_IN, KBD_IN, PLPS_OUT, and SWITCH_SPARE. The purpose of this system call is to allow a task to modify one of these redirectable mailboxes, such that any messages sent to it, actually go to one of the fixed mailboxes. Once the executive has performed the desired redirection, all subsequent mail to the redirection mailbox are placed is the fixed mailbox.

A call MC_RELINQ indicates that any other task should be allowed to run, as follows:

```
Software interrupt number: 025H
Input registers: none
Output registers: DH, DL
    DH (- 8 bit boolean (status flag))
        0 = fail
        1 = successful
    DL (- 8 bit integer (error number))
        0 = NO_ERROR
```

Other registers are unaltered.

This system call allows a currently running task to take itself out of execution in favor of any other task which is eligible to run.

The system's task handler keeps a queue of ready-to-run tasks, ordered by task priority. This system call suspends the caller and forces the task handler to be invoked, with the calling task temporarily taking on the lowest possible priority, so that any other task can be started. If there are no other tasks ready to run, then the calling task is restarted. Once a task has been selected to run, then the calling task is restored to its normal priority.

A call MS_GET_100 indicates get the current timer value, as follows:

```
Software interrupt number: 02EH
Input registers: none
Output registers: AX, DH, DL
    AX  (- 16 bit unsigned integer (timer value)
    DH  (- 8 bit boolean (status flag))
            1 = successful
        DL  (- 8 bit integer (error number))
            0 = NO_ERROR
```

Other registers are unaltered.

This system call returns the current value of the 100 Hertz interval timer, which increments by one, every 10 milliseconds. The returned value is a 16 bit unsigned integer. With 16 bits, the maximum single interval which can be measured correctly is slightly more than ten minutes. If a program waits more than ten minutes between calls, then any computed elapsed time is probably incorrect. Because the elapsed time value is an unsigned quantity, the computation of an interval can be done using a single unsigned subtraction. For example, if register AX contains the current time and if BX contains a previous time value, then the elapsed time is computed into register CX. The following is the result:

MOV CX, AX
SUB CX, BX

This produces an unsigned integer in the range 0 to 65536 (decimal).

Considering a call MC_STOP, this call indicates de-activate a task, as follows:

```
Software interrupt number: 026H
Input registers: BX
    BX  (- 16 bit integer (task number)
Output registers: DH, DL
    DH  (- 8 bit boolean (status flag))
            0 = fail
            1 = successful
    DL  (- 8 bit integer (error number))
            0 = NO_ERROR
            4 = ERR_T_RANGE
```

Other registers are unaltered.

This system call blocks the specified task from being rescheduled again for execution. If the specified task was currently running, then the executive stops the task and does not reschedule it until an MS_START is issued. A task can use this call to stop itself.

A call MC_START, represents activate a task, as follows:

```
Software interrupt number: 027H
Input registers: BX
    BX  (- 16 bit integer (task number)
Output registers: DH, DL
    DH  (- 8 bit boolean (status flag))
            0 = fail
            1 = successful
    DL  (- 8 bit integer (error number))
            0 = NO_ERROR
            4 = ERR_T_RANGE
```

Other registers are unaltered.

This executive routine makes the specified task eligible for execution. Instead, return is always made to the caller. The specified task only begins to execute when it is selected on a priority basis at some future time. If it is desirable to suspend the operation and execute the specified task, then an MC_RESUME is performed after the MC_START. If the specified task is already eligible for execution, ERR_T_ELIG status is returned.

Considering now a call MC_SETPC, this call indicates set start address for execution, is as follows:

```
Software interrupt number: 028H
Input registers: AX, BX, CX
    AX  (- 16 bit integer (segment number)
    BX  (- 16 bit integer (task number)
    CX  (- 16 bit integer (offset)
Output registers: DH, DL
    DH  (- 8 bit boolean (status flag))
            0 = fail
            1 = successful
    DL  (- 8 bit integer (error number))
            0 = NO_ERROR
            4 = ERR_T_RANGE
            6 = ERR_T_EXEC
```

Other registers are unaltered.

This executive routine sets the program counter of the specified task by setting its code segment register to "segment", and its program counter register to "offset". The designated task must be in the dormant state when the call is made. If the task is already executing then the call returns ERR_T_EXEC.

A call MC_EE_RD represents read EE_PROM, as follows:

```
Software interrupt number: 029H
Input registers: CX
    CX  (- 16 bit integer (address of data)
Output registers: AX, DH, DL
    AX  (- 16 bit integer (returned data)
    DH  (- 8 bit boolean (status flag))
            0 = fail
            1 = successful
    DL  (- 8 bit integer (error number))
            0 = NO_ERROR
            9 = ERR_EEP_RBSY
```

Other registers are unaltered.

This executive routine reads the EE_PROM byte at the specified address. If the non-volatile memory 114 (FIG. 2) is busy (in the process of writing), an ERR_EEP_RBSY error is returned. In that case, the microprocessor 81 should be relinquished by doing an MC_WTIO on the non-volatile memory, and then the operation is repeated when MC_WTIO returns.

Considering now a call MC_WTIO, this call represents wait for I/O port, as follows:

```
Software interrupt number: 02AH
Input registers: BX
    BX  (- 16 bit integer (device number)
Output registers: DH, DL
    DH  (- 8 bit boolean (status flag))
            1 = successful
    DL  (- 8 bit integer (error number))
            0 = NO_ERROR
            11 = ERR_P_RANGE
            12 = ERR_P_BUSY
```

Other registers are unaltered.

This system call suspends the calling task until the specified I/O device generates an interrupt. In telesoftware programs, only the EE_PROM memory should ever be waited upon.

A call MC_EE_WR represents write EE_PROM, as follows:

```
Software interrupt number: 02BH
Input registers: AL, CX
    AL   (- 8 bit byte (data byte to be written)
    CX   (- 16 bit address (EE_PROM byte address)
Output registers: DH, DL
    DH   (- 8 bit boolean (status flag))
         0 = fail
         1 = successful
    DL   (- 8 bit integer (error number))
         0 = NO_ERROR
         7 = ERR_EEP_WBSY
         8 = ERR_EEP_PROT
```

Other registers are unaltered.

This system call writes the given byte to the specified byte in the non-volatile memory. Since the non-volatile memory takes 10 milliseconds for each write, successive writes to the non-volatile memory are forced to wait at least that duration. If the non-volatile memory is busy, an MC_WTIO should be accomplished on the non-volatile memory, then the operation should be repeated. Further, the non-volatile memory contains protected data from address 00H to address 0FH; if these bytes are attempted to be written, an ERR_EEP_PROT status is returned.

Considering a call MC_RESUME, this call represents transfer control to a different task, as follows:

```
Software interrupt number: 02CH
Input registers: BX
    BX   (- 16 bit integer (task number)
Output registers: DH, DL
    DH   (- 8 bit boolean (status flag))
         0 = fail
         1 = successful
    DL   (- 8 bit integer (error number))
         0  = NO_ERROR
         4  = ERR_T_RANGE
         10 = ERR_NOT_ACT
```

Other registers are unaltered.

This system call suspends the calling task and immediately places the named task into execution. The caller is left in the ready state so that it can be rescheduled either by an MC RESUME, or by the task handler. The callee relinquishes control either by doing an MC_RESUME, or some task, or by making a system call which results in rescheduling. This amounts to a co-routine facility, which allows tasks to directly schedule each other.

If the relationships between the members of a group of tasks are clearly known, then the overhead of task scheduling is somewhat smaller if they use MC_RESUME on each other, instead of simply relinquishing the microprocessor 81, and allowing the task scheduler to pick a new task.

As an example of a simple and useful application of MC_RESUME, assume a telesoftware task which employs screen graphics using NAPLPS codes. Because mailboxes are implemented as FIFO queues, the task can transmit a short stream of NAPLPS bytes without having to block. Having placed the desired codes in the queue, they can be caused to be displayed by doing an MC RESUME of the NAPLPS decoder task. This is more effective than simply doing an MC_RELINQ because, since the decoder is the lowest priority task, and since higher priority tasks may also be waiting to run, it is quite possible that control can be regained without the decoder ever having been scheduled in the meantime. Once the decoder has emptied its input queues, then it blocks via an MC_RELINQ, allowing the telesoftware task to be scheduled when it becomes the highest priority eligible task.

MC_RESUME is used by the session level task to start the execution of telesoftware. This is done to avoid any delay in telesoftware task initialization. This eliminates the chance that a higher priority task could get activated and send a byte before the destination of the byte could be switched by the telesoftware task.

A call MC_DIAL represents make (or break) a telephone connection, as follows:

```
Software interrupt number: 02DH
Input registers: AX, CX (address of string holding number
    AX   (- 16 bit integer (segment base)
    BX   (- 16 bit integer (offset within segment)
Output registers: DH, DL
    DH   (- 8 bit boolean (status flag))
         1 = successful
    DL   (- 8 bit integer (error number))
         0  = NO_ERROR
         13 = ERR_NO_CARRIER
         14 = ERR_HANGUP
```

Other registers are unaltered.

This system call attempts to establish a telephone line conection, given a pointer to an ASCII string containing an encoded telephone number. The pointer is passed as two words-one containing the segment base address, the other containing the offset within the segment.

Because the length of the string is variable, the end must be marked with an ASCII NUL (a zero byte). If the string starts with an ASCII NUL, then the call is assumed to be a request to hang up the line. If that is the case, then the call returns with ERR_HANGUP status to signify that this was done.

The telephone number string may be formed from the following bytes:

| | |
|---|---|
| 000H | End of string |
| 00CH | Use pulse dialing (initial default) |
| 00DH | Use tone dialing |
| 023H | Send "#" tone (only if tone dialing) |
| 02AH | Send "*" tone (only if tone dialing) |
| 02DH | Pause for 2.7 seconds |
| 030H–039H | Send any digit from "0" through "9" |

Any other byte found in the string is ignored.

Before dialing the number, the system always terminates any previous connection which may have been made.

After dialing the number, the system waits for a carrier detect signal to be returned by the modem of the modem dialer 70, indicating that communication has been established. If none is found after a suitable interval, then the system assumes some error (such as wrong number or busy number) prevented the connection from being made, and returns ERR_NO CARRIER.

The following is a list of error codes:

| | | |
|---|---|---|
| NO_ERROR | 0 | |
| | The call was successful. | |
| ERR_B_RANGE | 1 | |
| | The mailbox number is out of range. | |
| ERR_BOX_FULL | 2 | |
| | The mailbox is full. | |
| ERR_BOX_EMPTY | 3 | |
| | The mailbox is empty. | |
| ERR_T_RANGE | 4 | |
| | The task number is out of range. | |
| ERR_T_ELIG | 5 | |
| | The task is already eligible to run. | |
| ERR_T_EXEC | 6 | |
| | The task is already executing. | |
| ERR_EEP_WBSY | 7 | |
| | Unable to write EE_PROM, because it is busy. | |
| ERR_EEP_PROT | 8 | |
| | Unable to write EE_PROM, because the location addressed is protected. | |
| ERR_EEP_RBSY | 9 | |
| | Unable to read from EE_PROM, because it is busy. | |
| ERR_NOT_ACT | 10 | |
| | The task is dormant and cannot be made to run. | |
| ERR_P_RANGE | 11 | |
| | The I/O device number is out of range. | |
| ERR_P_BUSY | 12 | |
| | Someone else is already waiting for an I/O interrupt on the requested port. If it is not possible to have more than one task do an MC_WTIO for the same device. | |
| ERR_NO_CARRIER | 13 | |
| | The MC_DIAL system call has dialed a number, but has not been able to detect a carrier signal from the callee. This can be due to a variety of reasons, such as the phone not being plugged in, no such number, busy number, no modem at the called number, or the modem at the called number is not ready. | |
| ERR_HANGUP | 14 | |
| | The MC_DIAL system call has disconnected (as requested), and has not dialed a new number. | |

Considering now the representative memory addresses, as follows:

| | |
|---|---|
| 000000H-00FFFFH | 64K bytes of data RAM |
| 010000H-012DFFH | 64K 4-bit nybbles of video display RAM (08000H-0FFFFH remapped as nybbles) (Each nybble is in the lower 4 bits of the byte. On read, the upper 4 bits are zero.) |
| 010000H-012DFFH | 10 scan lines reserved for PLPS |
| 012E00H-0137FFH | 10 scan lines - status line |
| 013800H-01FFFFH | 200 scan lines - display area |
| 020000H-02FFFFH | Nothing |
| 040000H-04FFFFH | 64K bytes reserved for bus extender |
| 000038H | Interrupt level 8 pointer |
| 050000H-05FFFFH | 64K bytes reserved for bus extender |
| 000030 | Interrupt level 9 pointer |
| 090000H-09000FH | Color map - 16 bytes of red |
| 090010H-09001FH | Color map - 16 bytes of blue |
| 090020H-09002FH | Color map - 16 bytes of green (Each color map byte uses only upper four bits. On read, lower four bits can be anything.) |
| 0C0000H-0C3FFFH | 16K bytes of telesoftware RAM memory |
| 0FFFF0H | Power up reset vector |

The lower 32K bits of the main memory is reserved for use by the PLPS for its data storage. The upper 32K bits (08000H-0FFFFH) is reserved for use as the display area (the nybble memory is mapped in to this space).

The nybble memory is structured to enable each pixel to be accessed individually. It provides a remapping of the upper 32K bits of the main memory, which allows the addressing of individual four-bit nybbles, instead of eight-bit bytes.

The nybbles are addressed as if they were bytes, except that the upper four bits of each byte are ignored on writing and are guaranteed to be returned as zeros when reading. The nybble memory provides a 256 by 256 block of nybble-sized pixels. Of these, a 256 by 210 pixel rectangle is visible on the display screen.

To access a pixel in the nybble memory, the recommended procedure is to first set the extra segment (ES) register with the base address of the memory area, then index from this base using an offset composed from the X and Y address as follows:

Bit   15   8 7   0
      / Y / X /

Considering what value should be entered into the ES register, there are three useful possibilities—the DRCS buffer base, the status line base, and the NAPLPS physical display area (PDA) base. The actual addresses are given in the foregoing table (but it should be noted that the segment register is loaded with only the top 16 bits of the 20 bit addresses shown). The DRCS buffer are is 256 pixels wide, by 46 high. It is reserved for use by PLPS for drawing DRCS characters. The status line area is 256 pixels wide, by 10 high, so that the Y address must be restricted to be in the range 0-9 in order to avoid overwriting the PDA. The PDA is 256 pixels wide, by 200 high.

Note that if the ES register is set to the PDA base, and if a Y address of 200 or greater is used, the resulting combined address lies in the 64K bit segment starting at 020000H. Since this segment is guaranteed to be empty, any attempt to write information to it, will be ignored. Thus, when writing pixels in the PDA, any address can be used in the 256 by 256 "unit screen" with the assurance that only those pixels which are part of the visible screen are displayed. Also, writes to pixels, which are in the unit screen, but outside the PDA, do not cause any unwanted side effects.

Considering now the bus extender reserved address space, there are two 64K bit areas (blocks 4 and 5) set aside for future expansion of the system by attaching additional peripherals or memories to an external bus extender connector 77 (FIG. 2).

Should it become desired to attach an interrupting peripheral device (not shown) to the bus 76 in this address space, there are also two interrupt levels reserved for use by devices in blocks 4 or 5. Initially, the level 8 interrupt pointer is set up to enter block 4 at address 040000H. Similarly, the level 9 interrupt pointer is set up to enter block 5 at address 050000H. The interrupt vectors can be modified by the user during device initialization if it is desired to relocate the interrupt handler at other than the zeroth word of the block.

Considering now the color map stored in the memory 101, as the CRT controller 103 scans each pixel in the display, it uses the four bit nybble value as an index into the color map, from which it obtains four bits each of red, green and blue intensity levels.

In the address space of the system, the color map appears as three separate vectors of 16 bytes each, with one vector for each of red, green and blue. In each byte of vector, the three least significant bits of the upper nybble contain intensitites for the display. The leftmost bit of the nybble is not used. On writes, the lower four bits are ignored. On reads, the returned value of the lower four bits is undefined (it could be anything and should be ignored).

The address of the three vectors are specified in the above table.

Considering now the telesoftware RAM memory 121, there is a 16K bit area of memory which is reserved for loading in telesoftware programs. All session level telesoftware load command addresses are assumed to be relative to the base address of this memory area. If it is desired to load code into some other area of memory, it must first be loaded into telesoftware RAM memory 121, and then copied to its actual destination using a block move.

Considering a cold start reset, if a task is to completely reset the state of the terminal, it can branch through the power up reset vector. This drops the communications line (if it is connected), completely reinitializes the whole system, and starts going through the power up pages.

Considering now the writing of tasks, when a task is first started it is given a standard default stack pointer. If another task is started up, it is given the same initial stack pointer. In order to avoid the possibility of sharing stack space with another task, the first step of any task is to set its stack pointer, to refer to a private stack area. To avoid leaving a window during which an interrupt can occur, while the stack pointer (SS and SP registers) is changing, a move to the SS register is first required, followed in the next instruction by a move to the SP register. The move to the SS register causes a temporary lockout of interrupts, until after the next instruction.

During an interrupt processing (including system calls), service routines use the stack of the interrupted task as a place to save registers. The amount of space reserved for a given stack should be adequate, so that there is available space any time for the storage of up to 40 extra words.

The session level "load telesoftware" command allows the loading of telesoftware code and data for any telesoftware task. However, the session level "execute telesoftware" command applies only to the TS task (task number 4).

Then the following session level commands affect the telesoftware tasks in the indicated ways:

| PLPL execute | MC_STOP on TS, TS2, TS3, and TS4 |
| load to TS address | MC_SETPC on TS |
| load TS code/data | MC_STOP on TS, TS2, TS3, and TS4 |
| TS executive | MC_START, mc_resume on TS |

Considering now the diagnostic software techniques employed in the system, the basic strategy is to bind in with the program to be diagnosed a small diagnostic or debugging program capable of setting and clearing breakpoints and dumping data onto some part of the display screen.

The hardware provides two methods for debugging: single-stepping and breakpoints. A breakpoint can be set by replacing the first byte of any instruction by a special one-byte variant of the INIT instruction which interrupts on level 3 (breakpoint interrupt). The breakpoint interrupt vector is at location OCH.

Single-stepping can be enabled by turning on the DF bit in the flag word. If the DF bit is turned on by a task, then only the code executed by the task is single-stepped, since every time an interrupt occurs, or the task makes a system call, the DF bit then gets turned off until the task state is restored. The single-step interrupt uses interrupt level one, whose vector is located at 04H.

Single-stepping can be enabled by turning on the DF bit in the flag word. If the DF bit is turned on by a task, then only the code executed by the task is single stepped, since every time an interrupt occurs or the task makes a system call, the DF bit then gets turned off until the task state is restored. The single-step interrupt uses interrupt level one, whose vector is located at 04H.

VII HOST SOFTWARE - SESSION/LINK PROTOCOL

Both the session and the link protocols for the host computer 14 will now be considered.

Considering the link layer protocol first, the link layer protocol provides the system 10 with control of the data integrity and the data flow over the communications. All the characters, with the exception of a few control characters, pass through the link layer unaltered. The few exception characters perform the control functions mentioned.

Considering now the operations of the link layer protocol, the link layer protocol performs three basic functions for the system:

(1) data flow control for the communications channel;

(2) data buffer control for the internal queues; and (3) data transparency for higher levels of protocol.

Data flow control requires that the data flowing over the communications channel can be stopped and started. The link protocol provides this control and uses two control characters 1/1 (Xon) and 1/3 (Xoff), to start and stop transmission respectively. The link layer checks the length of the input buffer, if there are less than 256 free bytes available, then a 1/3 (Xoff) is sent to the transmitter. The link layer subsequently sends a 1/1 (Xon) when the input queue length has diminished to 256 bytes. Note that this method has built in hysteresis and also provides sufficient space to store the extra bytes which are transmitted until the Xoff has been processed (latency problem).

When the link layer receives a 1/3 (Xoff), it does not transmit any more data until it receives a 1/1 (Xon). Note that if a character is being transmitted, the link layer completes that character and then stops transmitting. Also, Xoff is acted upon immediately for it is not queued in the input buffer.

Considering now the data buffer control, the 1/4 (DC4) character is acted upon immediately by the link layer. When this character is received, the link layer initialized the input queue parameters and sets the queue length to zero.

To allow data transparency, the link layer alters any data byte (not a control character) in the range 0/0 to 1/15. If the link layer is to transmit a data byte in the range 0/0 to 1/15, it first transmits a 1/0 (DLE), then it adds 2/0 to the data byte, and finally it transmits the result. If, the link layer receives a DLE character it deletes the DLE from the incoming data stream and then examines the next data byte. If the byte is in the range 2/0 to 3/15, the link layer subtracts 2/0 from the byte and then queues the byte; if the byte is not in this range, then the link layer simply queues it.

If multiple DLE characters are sent to the link layer, they are removed from the data stream and only the last DLE is used to transform the next sequential character.

If an EOT is sent to the terminal, the link layer removes it from the data stream.

The link layer (actually the session layer) can be made to generate an EOT character after a flagged data byte, as hereinafter described in greater detail.

The session layer protocol provides the following functions:

(1) terminal identification;
(2) selection of teminal echo modes;
(3) frame checking for error controls;
(4) frame acknowledgement for end-to-end frame control; and
(5) process selection for end-to-end communication.

In general, the session layer is invisible to data transmission; however, the various functions are easily invoked with the defined escape sequences. These escape sequences are identified in the published NAPLPS specification, and conform to that specification. The terminal 20 can be used in a normal NAPLPS data base with no embedded session commands; the terminal functions as a normal PLPS terminal. In the terminal 20, the back channel to the host computer 14 does not provide the end-to-end checking. Any process desiring that end-to-end checking provides the necessary routines and checks. The appropriate calls and data descriptions are hereinafter described in greater detail.

The interface between the link and session layers will now be considered. Considering first the incoming link layer passes a word to the session—in layer for every byte received (link control bytes are excluded). The word contains a flag in the upper byte, and the data in the lower byte. The flag is used to identify the data that has been preceded with DLE. The flag equals 1/0 if the data was preceded by a DLE character; otherwise, the flag equals 0. Note that a flagged data byte is in the range 0/0 to 1/15. The session—in layer then mails this word to the session—in mailbox.

Considering now the session—out layer, it passes a word to the link layer for every byte to be transmitted. The upper byte is a flag and the lower byte is the data to be transmitted. The flag bits are labelled as follows:

| 7 | (msb) | not used |
|---|---|---|
| 6 | | not used |
| 5 | | not used |
| 4 | | DLE protect required |
| 3 | | not used |
| 2 | | EOT byte to be transmitted after byte |
| 1 | | not used |
| 0 | (lsb) | not used if the DLE bit (bit 4) is set, then the link layer first examines the data byte. If the byte value is in the range 0/0 to 1/15, the link firstly transmits DLE, then adds 2/0 to the byte, and finally transmits the result. |

Considering the session commands, the five basic functions performed by the session layer protocol are terminal identification, echo mode selection, frame checking, frame acknowledgement, and process selection for data flow control. In performing these functions the session layer requires five corresponding sets of commands; these commands are listed as follows:

SEM — Session Enquiry Message

SRM — Session Response Message } Terminal Id

RRE — Request Remote Echo } Echo Mode
RLE — Request Local Echo

SFC — Start Frame Check } Frame Checking
EFC — End Frame Check

ACC — Accept Frame } Frame Acknowledgement
REJ — Reject Frame

S7 — Set 7 bit mode } Process-to Process Communication
S8 — Set 8 bit mode

Considering SEM, SRM, (session enquiry and response), after a terminal has logged-on to the system, the host computer 14 may request the terminal's identification using the SEM command. The host computer sends 1/11, 2/6, 3/0, i.e., ESC, 216, SRM The terminal responds with the SRM command followed by its own unique identification. The terminal identification number is the first 16 nybbles of information of the non-volatile memory in the terminal and has the following format:

Using this data, the terminal responds:
1/11, 2/6, 3/1, Manuf. ID, Model No., Serial No., Check Sum, 0/4.
i.e., ESC, 2/6, SRM, Manuf. ID, Model No., Serial No., Check Sum, EOT.

Note that, where it is required, DLE protection is provided for the data.

Considering, RRE, RLE (remote and local echo), at any time, the host computer may request for remote or local echo mode to be active in the terminal. To request remote echo mode (default at power-on), the host computer sends:

1/11, 2/6, 3/10; i.e. ESC, 2/6, RRE.

The session layer then sets an internal flag in the terminal for its echo mode. This flag is made available for process to examine, but should be altered only by the session layer.

The host computer likewise can request the local echo mode where the terminal first displays the character and then transmits it to the host computer. The host computer sends;

1/11, 2/6, 3/9; i.e. ESC, 2/6, RLE.

The session layer then sets the echo flag in the terminal accordingly.

Note that in PLPS, remote echo is always treated the same regardless of the state of the terminal; however, in local echo, the data is displayed in the first available unprotected field or on the "21st" line if no unprotected field exists.

The general form of these commands are:

| | ESC, 2/6, S7, process number; | . S7-3/2 |
|---|---|---|
| and | ESC, 2/6, S8, process number; | S8-3/3 |

In both cases, the acceptable process number are currently:
4/1—PLPS
5/1—Declare Telesoftware Address
5/2—Load Telesoftware
5/3—Execute Telesoftware The S7 and S8 commands force the incoming data stream to be switched to the specific process number. If S7 is chosen then a masking operation is performed on the incoming data to force the 8th bit off. Therefore, any process requiring 8 bit data should not use the S7 command.

These session commands cause the session-in mailbox to be redirected to the specified process; any running program or task can subsequently redirect the mailbox with the appropriate executive command.

The process numbers can be associated with either of the S7 or S8 commands, although some combinations are not of particular use. In the following list, all the combinations are shown with a brief description of each command.

| | |
|---|---|
| 1. ESC, 2/6, S7, 4/1 | Send 7 bit data to PLPS. |
| 2. ESC, 2/6, S8, 4/1 | Send 8 bit data to PLPS. |
| 3. ESC, 2/6, S7, 5/1, X, Y, L1, L2 | Should not be used. |
| 4. ESC, 2/6, S8, 5/1, X, Y, L1, L2 | Set Telesoftware Load address to X, Y with length L1, L2. |
| 5. ESC, 2/6, S7, 5/2 | Should not be used. |
| 6. ESC, 2/6, S8, 5/2 | Send 8 bit data to Telesoftware Loader. |
| 7. ESC, 2/6, S7, 5/3 | Execute Telesoftware and send 7 bit data to Telesoftware |
| 8. ESC, 2/6, S8, 5/3 | Execute Telesoftware and send 8 bit data to Telesoftware |

Items 3 and 5 above should not be used, because the data and parameters being passed from the host computer generally require 8 bit data.

Considering now the session layer implementation in the terminal, the terminal supports a subset of the described session layer commands since it is obvious that some commands are intended for use by a host computer only. For host-to-terminal communication, the terminal responds to:

SEM, RRE, RLE, SFC, EFC, S7 and S8; the other commands SRM, ACC, and REJ are discarded by the terminal.

For terminal-to-host communication, the terminal generates the following session commands; SRM, ACC, and REJ; the other commands may be supported by programs running in the terminal.

Considering SFC, EFC (start and end frame check), in data transmission, the integrity of the data can be checked using the available frame checking. In this check the host computer 14 sends an entire data frame which is bracketed with the SFC and EFC escape sequences. Within these escape sequences are the means for the terminal to identify and verify the data frame. The SFC and EFC commands are described as follows:

SFC—1/11, 2/6, 3/6, frame $\pi$ byte 0, frame # byte 1. i.e. ESC, 2/6, 3/6, Frame #0, Frame #1.

EFC—1/11, 2/6, e/7, check sum byte 0, check sum byte 1. i.e. ESC, 2/6, EFC, CS0, CS1.

The checksum includes all the bytes following the 3/6 (SFC) up to and including the 3/7 (EFC). Any PLE that is inserted by the link layer is not included in the checksum.

The terminal uses the frame id. fr#0, fr#1 as a means to accept or reject the frame. This frame identity is included in the ACC/REJ which is returned to the host computer.

Considering ACC, REJ, (accept and reject frame-acknowledgement), after receiving an EFC (end frame check) the terminal uses the next two incoming bytes CS0 and CS1 as the checksum for the current data frame. By predefined rules, these two bytes should cause the checksum registers within the terminal to go to zero. If the registers are zero, then the terminal accepts the frame; otherwise, the terminal rejects the data frame.

The frame number is received as part of the SFC (start frame check) command. The terminal stores the frame number until it receives the corresponding EFC to indicate the end of the data frame. If the terminal accepts the frame it sends:

1/11, 2/6, 3/14, fr#0. fr#1 i.e. ESC, 2/6, ACC, fr#0, fr#1.

Likewise, to reject a frame, the terminal sends:

1/11, 2/6, 3/15, fr#0. fr#1 i.e. ESC, 2/6, 3/15, fr#0, fr#1.

where fr#0 and fr#1 represent the frame number.

Note that on power up and after every EFC, the terminal initializes its frame number register to "DEAD". Thus, if no SFC is received properly, then the ACC/REJ frame number is "DEAD" indicating a bad frame.

Considering S7, S8—interprocess communication, using the S7 and S8 session commands, the host computer 14 may direct its output to specific processes running in the terminal. The S7 command causes all communications to be 7 bit ASCII with the 8th bit off. The S8 command causes all communication to be 8 bit ASCII.

While a particular embodiment of the present invention has been disclosed, it is to be understood that various different modifications are possible and are contemplated within the true spirit and scope of the appended claims. There is no intention, therefore, of limitations to the exact abstract or disclosure herein presented.

We claim:

1. An information retrieval system for establishing connections through a switching system to a remotely located host computer, comprising:
   a group of terminals, each one of the terminals being coupled to said switching system via a corresponding one of a plurality of communication paths;
   said terminals each include:
   manual input means for enabling the user to communicate with the switching system;
   memory means for storing a plurality of individual items of call origination information;
   call origination means coupled to the corresponding communication path for transmitting said items of call origination information via said corresponding communication path to the switching system for causing it to extend the corresponding communication path to the host computer; and
   logic means for transferring the items of call origination information to said call origination means;
   prioritizing means for designating a priority associated with a first item and a second item of the plurality of individual items of call origination information, to produce an ordered sequence of priorities based upon a cost associated with each one of the first and second items of call origination information;
   means for causing said logic means to transfer a first one of said items of said call origination information to said call origination means in an attempt to extend a communication path to said host computer;

means for receiving a busy signal indicative of an unsuccessful attempt to extend the communication path; and means responsive to said busy signal and to said prioritizing means for causing said logic means for causing said logic means to transfer a second one of said items of a lower priority to said call origination means in a further attempt to extend a communication path to said host computer.

2. An information retrieval system according to claim 1, wherein said memory means includes non-volatile memory means, and wherein said items of information include an initial item for enabling an initial communication path to be established to said host computer from one of said terminals when it is first cut into service, said logic means for causing terminal identification information to be sent to the host computer, said information including location information of the terminal, and said host computer responds thereto by sending the remaining ones of said items of call origination information to the terminal for storage in its non-volatile memory means.

3. An information retrieval system according to claim 1, further includes a plurality of geographically distributed communication path concentrating means for concentrating M number of groups of communication paths into N number of groups of communication paths extending between said concentrating means and said host computer, and wherein said M is greater than said N.

4. An information retrieval system according to claim 3, wherein said concentrating means includes time division multiplexing means for multiplexing a plurality of communication paths, and further includes additional time division multiplexing means located geographically near said host computer for de-multiplexing the plurality of communication paths.

5. An information retrieval system according to claim 4, wherein said logic means of each one of said group of terminals retrieves said plurality of individual items of call origination information from said memory means according to a predetermined priority, where selected ones of the plurality of individual items of call information are retrieved and sent first to establish a path to a selected one of the concentrating means that is geographically closest to the terminal.

6. An information retrieval system for establishing connections through a switching system to a remotely located host computer, comprising:

a group of terminals coupled to said switching system via communication paths, each one of the terminals being coupled via a corresponding one of the communication paths;

a plurality of geographically distributed communication path concentrating means for concentrating M number of groups of communication paths into N number of groups of communication paths extending between said concentrating means and said host computer, said M being a number greater than said N number; and said terminals each including means for sending call origination information according to a predetermined priority where the concentrating means that is geographically closest to the terminal is called first.

7. An information retrieval system according to claim 6, wherein said system includes manual input means for enabling the user to communicate with the switching system.

8. An information retrieval system according to claim 7, wherein said input means includes a keyboard.

9. An information retrieval system according to claim 8, wherein said system includes memory means for storing a plurality of individual items of call origination information.

10. An information retrieval system according to claim 9, wherein said system includes logic means for transferring the items of call origination information to said means for sending call origination information.

11. An information retrieval system according to claim 10, wherein said system includes prioritizing means for designating a priority associated with a first item and a second item of the plurality of individual items of call orgination information, to produce an ordered sequence of priorities based upon a cost associated with each one of the first and second items of call origination information.

12. An information retrieval system according to claim 11, wherein said system includes means for causing said logic means to transfer a first one of said items of said call origination information to said call origination means in an attempt to extend a communication path to said host computer.

13. An information retrieval system according to claim 12, wherein said system includes means for receiving a busy signal indicative of an unsuccessful attempt to extend the communication path.

14. An information retrieval system according to claim 13, wherein said system includes means responsive to said busy signal and to said prioritizing means for causing said logic means for causing said logic means to transfer a second one of said items of a lower priority to said call origination means in a further attempt to extend a communication path to said host computer.

15. An information retrieval method of establishing connections from a group of terminals through a switching system to a remotely located host computer, comprising:

using a group of terminals coupled to said switching system via a corresponding one of a plurality of communication paths, each one of said terminals including manual input means for enabling the user to communicate with the switching system;

memory means for storing a plurality of individual items of call origination information;

call origination means coupled to the corresponding communication path for transmitting said items of call origination information via said corresponding communication path to the switching system for causing it to extend the corresponding communication path to the host computer; and logic means for transferring the items of call origination information to said call origination means;

establishing and concentrating through geographically distributed concentrating means, M number of groups of communication paths into N number of groups of communication paths extending between said concentrating means and said host computer, said M being a number greater than said N number; and using the logic means to send call origination information from each one of said terminals according to a predetermined priority where the concentrating means that is geographically closest to the terminal is called first, including:

designating a priority associated with a first item and a second item of the plurality of individual items of call origination information, to produce an ordered sequence of priorities based upon a cost associated with each one of the first and second items of call origination information;

causing said logic means to transfer a first one of said items of said call origination information to said call origination means in an attempt to extend a communication path to said host computer;

receiving a busy signal indicative of an unsuccessful attempt to extend the communication path; and responsive to said busy signal and to the designated priority, causing said logic means to transfer a second one of said items of a lower priority to said call origination means in a further attempt to extend a communication path to said host computer.

* * * * *

UNITED STATES PATENT AND TRADEMARK OFFICE
CERTIFICATE OF CORRECTION

PATENT NO. : 4,649,533

DATED : March 10, 1987

INVENTOR(S) : WILLIAM CHORLEY, ET AL

It is certified that error appears in the above–identified patent and that said Letters Patent are hereby corrected as shown below:

Col. 63, Line 8:
   delete "for causing said logic means"
Col. 64, Lines 36-37:
   delete "for causing said logic means"

Signed and Sealed this

Seventeenth Day of November, 1987

Attest:

DONALD J. QUIGG

*Attesting Officer*　　　　　*Commissioner of Patents and Trademarks*